(12) United States Patent
Bird

(10) Patent No.: US 12,410,104 B2
(45) Date of Patent: Sep. 9, 2025

(54) METHODS OF FORMING CUTTING ELEMENTS

(71) Applicant: Baker Hughes Holdings LLC, Houston, TX (US)

(72) Inventor: Marc W. Bird, Houston, TX (US)

(*) Notice: Subject to any disclaimer, the term of this patent is extended or adjusted under 35 U.S.C. 154(b) by 819 days.

(21) Appl. No.: 16/581,152

(22) Filed: Sep. 24, 2019

(65) Prior Publication Data

US 2020/0031724 A1 Jan. 30, 2020

Related U.S. Application Data

(62) Division of application No. 15/594,174, filed on May 12, 2017, now Pat. No. 11,292,750.

(51) Int. Cl.
*C04B 35/645* (2006.01)
*B22F 5/00* (2006.01)
(Continued)

(52) U.S. Cl.
CPC ............ *C04B 35/6455* (2013.01); *B22F 7/06* (2013.01); *B23B 27/20* (2013.01); *C04B 35/5626* (2013.01); *C04B 35/6303* (2013.01); *C04B 35/638* (2013.01); *C22C 1/051* (2013.01); *C22C 19/007* (2013.01); *C22C 19/07* (2013.01); *C22C 29/005* (2013.01); *C22C 29/08* (2013.01); *E21B 10/46* (2013.01); *E21B 10/5673* (2013.01); *B22F 2005/001* (2013.01); *B22F 2998/10* (2013.01); *C04B 2235/3847* (2013.01);
(Continued)

(58) Field of Classification Search
CPC .................................................. C22C 29/005
See application file for complete search history.

(56) References Cited

U.S. PATENT DOCUMENTS 3,141,746 A ‡ 7/1964 De Lai .................... B01J 3/065
51/309
3,609,818 A ‡ 10/1971 Wentorf, Jr. ............. B01J 3/062
425/77
(Continued)

FOREIGN PATENT DOCUMENTS

CN 101168229 A ‡ 4/2008
CN 101611210 A ‡ 12/2009
(Continued)

OTHER PUBLICATIONS

JP 2019090098 A English Machine Translation (Year: 2017).*
(Continued)

*Primary Examiner* — Keith Walker
*Assistant Examiner* — Catherine P Smith
(74) *Attorney, Agent, or Firm* — Baker Hughes Company

(57) ABSTRACT

A method of forming a supporting substrate for a cutting element comprises forming a precursor composition comprising discrete WC particles, a binding agent, and discrete particles comprising Co, Al, and one or more of C and W. The precursor composition is subjected to a consolidation process to form a consolidated structure including WC particles dispersed in a homogenized binder comprising Co, Al, W, and C. A method of forming a cutting element, a cutting element, a related structure, and an earth-boring tool are also described.

10 Claims, 8 Drawing Sheets

(51) Int. Cl.
  *B22F 7/06*       (2006.01)
  *B23B 27/20*      (2006.01)
  *C04B 35/56*      (2006.01)
  *C04B 35/63*      (2006.01)
  *C04B 35/638*     (2006.01)
  *C22C 1/051*      (2023.01)
  *C22C 19/00*      (2006.01)
  *C22C 19/07*      (2006.01)
  *C22C 29/00*      (2006.01)
  *C22C 29/08*      (2006.01)
  *E21B 10/46*      (2006.01)
  *E21B 10/567*     (2006.01)

(52) U.S. Cl.
  CPC .. *C04B 2235/402* (2013.01); *C04B 2235/404* (2013.01); *C04B 2235/405* (2013.01); *C04B 2235/427* (2013.01); *C04B 2235/604* (2013.01); *C04B 2235/85* (2013.01); *C04B 2235/9607* (2013.01)

(56) References Cited

U.S. PATENT DOCUMENTS

| | | | | |
|---|---|---|---|---|
| 3,745,623 A ‡ | 7/1973 | Wentorf, Jr. | ............ | B01J 3/062 407/11 |
| 3,850,591 A ‡ | 11/1974 | Wentorf, Jr. | ............ | B01J 3/062 51/307 |
| 4,394,170 A ‡ | 7/1983 | Sawaoka | ............ | B01J 3/062 501/87 |
| 4,403,015 A ‡ | 9/1983 | Nakai | ............ | B01J 3/062 419/13 |
| 4,505,746 A ‡ | 3/1985 | Nakai | ............ | B01J 3/062 419/11 |
| 4,525,178 A ‡ | 6/1985 | Hall | ............ | E21B 10/22 51/309 |
| 4,636,253 A ‡ | 1/1987 | Nakai | ............ | B01J 3/062 75/239 |
| 4,694,918 A ‡ | 9/1987 | Hall | ............ | B22F 7/06 175/41 |
| 4,794,326 A ‡ | 12/1988 | Friedl | ............ | H01F 38/30 324/11 |
| 4,907,377 A ‡ | 3/1990 | Csillag | ............ | B01J 3/062 51/307 |
| 4,911,989 A ‡ | 3/1990 | Minoru | ............ | C22C 1/051 419/13 |
| 4,954,139 A ‡ | 9/1990 | Cerutti | ............ | B01J 3/062 51/293 |
| 4,975,125 A ‡ | 12/1990 | Chakrabarti et al. | ... | C22C 14/00 148/40 |
| 5,106,674 A ‡ | 4/1992 | Okada | ............ | C22C 29/02 407/11 |
| 5,111,895 A ‡ | 5/1992 | Griffin | ............ | C04B 37/021 175/37 |
| 5,127,923 A ‡ | 7/1992 | Bunting | ............ | B24D 3/007 51/293 |
| 5,128,080 A ‡ | 7/1992 | Jurewicz | ............ | C22C 26/00 264/66 |
| 5,266,236 A ‡ | 11/1993 | Bovenkerk | ............ | B01J 3/062 252/50 |
| 5,288,676 A ‡ | 2/1994 | Shimada | ............ | C22C 29/08 428/53 |
| 5,304,342 A ‡ | 4/1994 | Hall, Jr. | ............ | B01J 3/062 419/11 |
| 5,310,605 A ‡ | 5/1994 | Baldoni, II | ............ | C22C 1/051 419/10 |
| 5,468,268 A ‡ | 11/1995 | Tank | ............ | B01J 3/06 51/293 |
| 5,505,748 A ‡ | 4/1996 | Tank | ............ | B01J 3/062 51/293 |
| 5,580,666 A ‡ | 12/1996 | Dubensky | ............ | C22C 29/08 428/54 |
| 5,649,279 A ‡ | 7/1997 | Gustafson | ............ | C22C 1/051 419/25 |
| 5,880,382 A ‡ | 3/1999 | Fang | ............ | C22C 1/051 175/37 |
| 5,955,186 A ‡ | 9/1999 | Grab | ............ | C23C 30/005 407/11 |
| 5,992,546 A ‡ | 11/1999 | Heinrich | ............ | C22C 29/067 175/37 |
| 6,024,776 A ‡ | 2/2000 | Heinrich | ............ | C22C 19/07 75/238 |
| 6,217,992 B1 ‡ | 4/2001 | Grab | ............ | C23C 30/005 407/11 |
| 6,248,447 B1 ‡ | 6/2001 | Griffin | ............ | C04B 37/021 175/43 |
| 6,261,329 B1 ‡ | 7/2001 | Ogata | ............ | C04B 35/52 419/11 |
| 6,294,129 B1 ‡ | 9/2001 | Waldenstrom | ............ | C22C 1/051 419/18 |
| 6,432,150 B1 ‡ | 8/2002 | Levashov | ............ | B22F 3/23 164/97 |
| 6,517,902 B2 ‡ | 2/2003 | Drake | ............ | C22C 1/1094 427/24 |
| 6,541,115 B2 ‡ | 4/2003 | Pender | ............ | C04B 41/009 407/11 |
| 6,846,341 B2 ‡ | 1/2005 | Middlemiss | ............ | B22F 7/06 51/293 |
| 7,074,247 B2 ‡ | 7/2006 | Tank | ............ | B22F 7/06 264/64 |
| 7,462,003 B2 ‡ | 12/2008 | Middlemiss | ............ | B22F 7/06 407/11 |
| 7,475,948 B2 ‡ | 1/2009 | Hall | ............ | E21C 35/183 299/10 |
| 7,487,849 B2 ‡ | 2/2009 | Radtke | ............ | E21B 10/5735 175/43 |
| 7,556,668 B2 ‡ | 7/2009 | Eason et al. | ............ | B22F 3/15 175/42 |
| 7,569,179 B2 ‡ | 8/2009 | Fang | ............ | B22F 7/02 419/14 |
| 7,635,035 B1 ‡ | 12/2009 | Bertagnolli | ............ | B32B 9/00 175/43 |
| 7,678,325 B2 ‡ | 3/2010 | Gardinier | ............ | C22C 26/00 264/60 |
| 7,691,173 B2 ‡ | 4/2010 | Eason | ............ | B22F 3/15 175/42 |
| 7,699,904 B2 ‡ | 4/2010 | Fang | ............ | B22F 7/02 419/18 |
| 7,757,791 B2 ‡ | 7/2010 | Belnap | ............ | B22F 7/06 175/37 |
| 7,829,013 B2 | 11/2010 | Eason et al. | | |
| 7,879,129 B2 ‡ | 2/2011 | Kosters | ............ | C22C 26/00 175/42 |
| 8,080,071 B1 ‡ | 12/2011 | Vail | ............ | B24D 99/005 175/43 |
| 8,147,574 B2 ‡ | 4/2012 | Montross | ............ | B01J 3/062 51/307 |
| 8,162,082 B1 ‡ | 4/2012 | Gonzalez | ............ | E21B 10/567 175/42 |
| 8,490,721 B2 ‡ | 7/2013 | Naidoo | ............ | B24D 99/005 175/42 |
| 8,496,076 B2 ‡ | 7/2013 | DiGiovanni et al. | ............ | B24D 18/0009 175/43 |
| 8,512,874 B2 ‡ | 8/2013 | Darolia et al. | ............ | C23C 4/18 416/24 |
| 8,522,900 B2 ‡ | 9/2013 | Bellin | ............ | B24D 3/06 175/43 |
| 8,579,052 B2 ‡ | 11/2013 | DiGiovanni et al. | ............ | B24D 99/005 175/40 |
| 8,651,203 B2 ‡ | 2/2014 | DiGiovanni | ............ | B24D 99/005 175/42 |
| 8,703,245 B2 | 4/2014 | Layyous et al. | | |
| 8,727,042 B2 ‡ | 5/2014 | DiGiovanni | ............ | B24D 99/005 175/42 |
| 8,764,919 B2 ‡ | 7/2014 | Nazmy et al. | ............ | C22C 19/07 148/42 |

(56) References Cited

U.S. PATENT DOCUMENTS

| | | | |
|---|---|---|---|
| 8,936,116 B2 ‡ | 1/2015 | Lyons | E21B 10/5735 |
| | | | 175/42 |
| 9,027,675 B1 ‡ | 5/2015 | Jones | E21B 10/46 |
| | | | 175/42 |
| 9,085,489 B2 ‡ | 7/2015 | Naidoo | C04B 37/026 |
| 9,103,172 B1 ‡ | 8/2015 | Bertagnolli | E21B 10/567 |
| 9,255,316 B2 ‡ | 2/2016 | Bryan | C22F 1/18 |
| 9,272,392 B2 ‡ | 3/2016 | Mukhopadhyay | B01J 3/062 |
| 9,487,847 B2 ‡ | 11/2016 | Mukhopadhyay | B22F 7/062 |
| 9,540,885 B2 ‡ | 1/2017 | Mukhopadhyay | B22F 3/14 |
| 9,610,555 B2 ‡ | 4/2017 | Mukhopadhyay | B01J 3/065 |
| 9,649,748 B2 ‡ | 5/2017 | Konovalov | B24D 3/06 |
| 9,657,529 B1 ‡ | 5/2017 | Bertagnolli | E21B 10/567 |
| 9,718,168 B2 ‡ | 8/2017 | Mukhopadhyay | B24D 3/10 |
| 9,719,307 B1 ‡ | 8/2017 | Bertagnolli | B32B 9/00 |
| 9,765,572 B2 ‡ | 9/2017 | Knuteson | B24D 3/10 |
| 11,292,750 B2 | 4/2022 | Bird | |
| 2002/0020564 A1 ‡ | 2/2002 | Fang | B22F 1/0003 |
| | | | 175/37 |
| 2002/0112896 A1 ‡ | 8/2002 | Kruse | C22C 29/08 |
| | | | 175/42 |
| 2002/0194955 A1 ‡ | 12/2002 | Fang | C09K 3/1418 |
| | | | 75/240 |
| 2003/0113560 A1 ‡ | 6/2003 | Yong | E21B 10/56 |
| | | | 428/46 |
| 2003/0129456 A1 ‡ | 7/2003 | Usami | B24D 3/06 |
| | | | 428/69 |
| 2004/0159471 A1 ‡ | 8/2004 | Azar | B22F 7/06 |
| | | | 175/43 |
| 2004/0187638 A1 ‡ | 9/2004 | Heinrich | C22C 1/053 |
| | | | 75/240 |
| 2005/0050801 A1 * | 3/2005 | Cho | B22F 7/062 |
| | | | 428/548 |
| 2005/0115744 A1 ‡ | 6/2005 | Griffin | C04B 37/021 |
| | | | 175/43 |
| 2005/0133277 A1 ‡ | 6/2005 | Dixon | B23C 5/1009 |
| | | | 175/42 |
| 2005/0230156 A1 ‡ | 10/2005 | Belnap | B22F 7/06 |
| | | | 175/37 |
| 2005/0262965 A1 ‡ | 12/2005 | Palanisamy | C22C 29/06 |
| | | | 75/236 |
| 2006/0162969 A1 ‡ | 7/2006 | Belnap | B22F 7/06 |
| | | | 175/43 |
| 2006/0166615 A1 ‡ | 7/2006 | Tank | B22F 7/06 |
| | | | 451/54 |
| 2006/0263233 A1 ‡ | 11/2006 | Gardinier | A61F 2/32 |
| | | | 419/11 |
| 2007/0023206 A1 ‡ | 2/2007 | Keshavan | E21B 10/16 |
| | | | 175/374 |
| 2007/0056778 A1 ‡ | 3/2007 | Webb | B01J 3/062 |
| | | | 175/43 |
| 2007/0099030 A1 ‡ | 5/2007 | Dahl | C04B 35/58021 |
| | | | 428/698 |
| 2007/0102200 A1 ‡ | 5/2007 | Choe | E21B 10/567 |
| | | | 175/37 |
| 2007/0186483 A1 ‡ | 8/2007 | Tank | B22F 7/06 |
| | | | 51/297 |
| 2007/0187153 A1 ‡ | 8/2007 | Bertagnolli | B01J 3/062 |
| | | | 175/37 |
| 2007/0187155 A1 ‡ | 8/2007 | Middlemiss | C22C 26/00 |
| | | | 175/42 |
| 2007/0292671 A1 ‡ | 12/2007 | Akesson | C22C 29/08 |
| | | | 428/21 |
| 2007/0292672 A1 ‡ | 12/2007 | Ljungberg | C22C 29/08 |
| | | | 428/21 |
| 2008/0011519 A1 * | 1/2008 | Smith | E21B 10/46 |
| | | | 175/426 |
| 2008/0017421 A1 ‡ | 1/2008 | Lockwood | B24D 3/06 |
| | | | 175/43 |
| 2008/0073126 A1 ‡ | 3/2008 | Shen | E21B 10/567 |
| | | | 175/43 |
| 2008/0073127 A1 ‡ | 3/2008 | Zhan | B24D 3/02 |
| | | | 175/43 |
| 2008/0075543 A1 ‡ | 3/2008 | Zhu | B23B 27/14 |
| | | | 407/11 |
| 2008/0115421 A1 ‡ | 5/2008 | Sani | B22F 7/08 |
| | | | 51/295 |
| 2008/0128176 A1 ‡ | 6/2008 | Choe | B22D 23/00 |
| | | | 175/43 |
| 2008/0142276 A1 ‡ | 6/2008 | Griffo | E21B 10/5735 |
| | | | 175/43 |
| 2008/0185078 A1 ‡ | 8/2008 | Ishida et al. | C22C 19/07 |
| | | | 148/67 |
| 2008/0185189 A1 ‡ | 8/2008 | Griffo | B01J 3/062 |
| | | | 175/43 |
| 2008/0223621 A1 ‡ | 9/2008 | Middlemiss | B22F 7/062 |
| | | | 175/42 |
| 2008/0223623 A1 ‡ | 9/2008 | Keshavan | B01J 3/062 |
| | | | 175/43 |
| 2008/0230280 A1 ‡ | 9/2008 | Keshavan | C22C 1/05 |
| | | | 175/43 |
| 2008/0295658 A1 ‡ | 12/2008 | Donnadieu | C04B 35/581 |
| | | | 83/13 |
| 2008/0302579 A1 ‡ | 12/2008 | Keshavan et al. | B22F 7/08 |
| | | | 175/43 |
| 2009/0017332 A1 ‡ | 1/2009 | Kisi | C04B 35/4508 |
| | | | 428/69 |
| 2009/0022952 A1 ‡ | 1/2009 | Keshavan | B24D 3/06 |
| | | | 428/14 |
| 2009/0032169 A1 ‡ | 2/2009 | Dourfaye | C22C 1/1068 |
| | | | 156/90 |
| 2009/0071727 A1 ‡ | 3/2009 | Keshavan | C04B 35/52 |
| | | | 175/43 |
| 2009/0090563 A1 ‡ | 4/2009 | Voronin | B22F 7/06 |
| | | | 175/43 |
| 2009/0114454 A1 ‡ | 5/2009 | Belnap | B22F 7/06 |
| | | | 175/43 |
| 2009/0152018 A1 ‡ | 6/2009 | Sani | B21C 3/02 |
| | | | 175/43 |
| 2009/0173015 A1 ‡ | 7/2009 | Keshavan | B01J 3/062 |
| | | | 51/307 |
| 2009/0173547 A1 ‡ | 7/2009 | Voronin | B22F 7/062 |
| | | | 175/37 |
| 2009/0178855 A1 ‡ | 7/2009 | Zhang | E21B 10/5676 |
| | | | 175/42 |
| 2009/0183925 A1 ‡ | 7/2009 | Zhang | E21B 10/5676 |
| | | | 175/43 |
| 2009/0260895 A1 ‡ | 10/2009 | Vail | B01J 3/062 |
| | | | 175/43 |
| 2009/0324873 A1 ‡ | 12/2009 | Weis | B01J 19/02 |
| | | | 428/81 |
| 2010/0012389 A1 ‡ | 1/2010 | Zhang | B24D 99/005 |
| | | | 175/43 |
| 2010/0038148 A1 ‡ | 2/2010 | King | C04B 35/515 |
| | | | 175/43 |
| 2010/0050536 A1 | 3/2010 | Montross | |
| 2010/0061883 A1 * | 3/2010 | Nazmy | C22C 19/07 |
| | | | 420/435 |
| 2010/0084196 A1 ‡ | 4/2010 | Bertagnolli | C22C 26/00 |
| | | | 175/42 |
| 2010/0084197 A1 ‡ | 4/2010 | Voronin | B22F 7/062 |
| | | | 175/42 |
| 2010/0104874 A1 ‡ | 4/2010 | Yong | C22C 26/00 |
| | | | 428/40 |
| 2010/0122852 A1 ‡ | 5/2010 | Russell | C22C 26/00 |
| | | | 175/42 |
| 2010/0126779 A1 ‡ | 5/2010 | Corbett | B22F 7/06 |
| | | | 175/43 |
| 2010/0199573 A1 ‡ | 8/2010 | Montross et al. | C22C 26/00 |
| | | | 51/307 |
| 2010/0275523 A1 ‡ | 11/2010 | Tank | C04B 35/65 |
| | | | 51/307 |
| 2010/0285335 A1 ‡ | 11/2010 | Sithebe et al. | C22C 26/00 |
| | | | 428/69 |
| 2010/0287845 A1 | 11/2010 | Montross et al. | |
| 2011/0067929 A1 ‡ | 3/2011 | Mukhopadhyay | B01J 3/062 |
| | | | 175/43 |

(56) References Cited

U.S. PATENT DOCUMENTS

| | | | |
|---|---|---|---|
| 2011/0114394 A1‡ | 5/2011 | Lockwood | B22D 19/14 175/42 |
| 2011/0116963 A1‡ | 5/2011 | Fang | B22F 3/1017 419/18 |
| 2011/0171484 A1‡ | 7/2011 | Konyashin | C23C 26/02 428/55 |
| 2011/0315051 A1‡ | 12/2011 | Olsen | C22C 29/06 106/286.6 |
| 2012/0005966 A1‡ | 1/2012 | Cleboski | E21B 10/46 51/295 |
| 2012/0012402 A1‡ | 1/2012 | Thigpen | C22C 26/00 175/43 |
| 2012/0031675 A1‡ | 2/2012 | Truemner | B01J 3/062 175/57 |
| 2012/0034464 A1‡ | 2/2012 | Chakraborty | B82Y 30/00 428/40 |
| 2012/0040183 A1‡ | 2/2012 | Kelkar | B22F 3/1035 428/36 |
| 2012/0055716 A1‡ | 3/2012 | Martensson | C22C 26/00 175/42 |
| 2012/0151848 A1‡ | 6/2012 | Suryavanshi | B22F 5/00 51/309 |
| 2012/0212249 A1‡ | 8/2012 | Chen | G01R 3/00 324/75 |
| 2012/0324801 A1* | 12/2012 | Fang | B24D 99/005 175/428 |
| 2012/0325565 A1‡ | 12/2012 | Fang | B22F 3/1035 175/43 |
| 2013/0092449 A1‡ | 4/2013 | Fang | B22F 3/156 175/37 |
| 2013/0092451 A1 | 4/2013 | Mukhopadhyay et al. | |
| 2013/0092452 A1‡ | 4/2013 | Mukhopadhyay | B22F 7/062 175/42 |
| 2013/0133957 A1‡ | 5/2013 | Belnap | E21B 10/567 175/43 |
| 2013/0206287 A1‡ | 8/2013 | Sato et al. | C22C 19/055 148/42 |
| 2014/0007995 A1* | 1/2014 | Ishida | C22C 19/07 148/674 |
| 2014/0023546 A1‡ | 1/2014 | Konyashin | B22F 3/24 419/18 |
| 2014/0086782 A1‡ | 3/2014 | Gries | C22C 29/00 419/12 |
| 2014/0134403 A1‡ | 5/2014 | Gledhill | E21B 10/5735 428/17 |
| 2014/0154509 A1* | 6/2014 | Zhang | C04B 35/52 156/304.6 |
| 2014/0174633 A1‡ | 6/2014 | Andersin | C04B 35/5611 156/89 |
| 2014/0231151 A1‡ | 8/2014 | Matthias | B24D 18/0009 175/43 |
| 2014/0311810 A1‡ | 10/2014 | Konyashin | C22C 26/00 175/43 |
| 2014/0353047 A1‡ | 12/2014 | Naidoo | C04B 35/52 175/43 |
| 2015/0136495 A1‡ | 5/2015 | Knuteson | E21B 10/5735 175/428 |
| 2015/0284827 A1‡ | 10/2015 | Can | E21B 10/567 51/309 |
| 2015/0292270 A1* | 10/2015 | Zhang | C22C 26/00 51/307 |
| 2015/0376744 A1‡ | 12/2015 | Konyashin | C22C 29/067 51/309 |
| 2016/0053549 A1 | 2/2016 | Digiovanni et al. | |
| 2016/0063549 A1‡ | 3/2016 | Fuchs | G06Q 30/0255 705/14 |
| 2016/0265285 A1‡ | 9/2016 | Stockey | E21B 10/567 |
| 2017/0254153 A1‡ | 9/2017 | Bird | C22C 29/005 |
| 2017/0266784 A1‡ | 9/2017 | Zhang | C04B 35/528 |
| 2017/0267588 A1 | 9/2017 | Shin et al. | |
| 2017/0297960 A1‡ | 10/2017 | Zhang | C22C 26/00 |
| 2018/0238116 A1‡ | 8/2018 | Mukhopadhyay | E21B 10/5735 |
| 2018/0327888 A1‡ | 11/2018 | Cao | B22F 3/15 |
| 2018/0328117 A1 | 11/2018 | Bird | |
| 2019/0076920 A1* | 3/2019 | Ishii | B22F 1/105 |
| 2019/0368278 A1‡ | 12/2019 | Cao | C04B 35/5607 |
| 2022/0298866 A1 | 9/2022 | Cao et al. | |

FOREIGN PATENT DOCUMENTS

| | | | |
|---|---|---|---|
| CN | 101755066 A | ‡ | 6/2010 |
| CN | 102187048 A | ‡ | 9/2011 |
| CN | 102281974 A | | 12/2011 |
| CN | 103722174 A | ‡ | 4/2014 |
| CN | 104057094 A | ‡ | 9/2014 |
| CN | 106011653 A | ‡ | 10/2016 |
| DE | 102006018947 A1 | ‡ | 10/2007 |
| EP | 0278703 A2 | ‡ | 8/1988 |
| EP | 0476352 A1 | ‡ | 3/1992 |
| EP | 0974566 A1 | ‡ | 1/2000 |
| EP | 3369831 A1 | ‡ | 9/2018 |
| GB | 2489583 A | ‡ | 10/2012 |
| JP | 01-116048 A | | 5/1989 |
| JP | 03-054166 A | ‡ | 3/1991 |
| JP | 2014-208889 A | ‡ | 11/2014 |
| JP | 2019090098 A | * | 6/2019 |
| WO | WO-2004/054943 A1 | ‡ | 7/2004 |
| WO | 2006/001791 A1 | | 1/2006 |
| WO | WO-2006001791 | ‡ | 1/2006 |
| WO | WO-2006/032984 A2 | ‡ | 3/2006 |
| WO | WO-2007/035394 A2 | ‡ | 3/2007 |
| WO | WO-2007/110770 A2 | ‡ | 10/2007 |
| WO | WO-2008/086284 A2 | ‡ | 7/2008 |
| WO | WO-2009/027948 A1 | ‡ | 3/2009 |
| WO | WO-2009/027949 A1 | ‡ | 3/2009 |
| WO | WO-2009/147629 A1 | ‡ | 12/2009 |
| WO | WO-2010/029518 A1 | ‡ | 3/2010 |
| WO | 2013/087728 A2 | | 6/2013 |
| WO | WO-2013/087773 A1 | ‡ | 6/2013 |
| WO | WO-2013087728 | ‡ | 6/2013 |
| WO | WO-2013092370 A1 | ‡ | 6/2013 |
| WO | 2013/178550 A1 | | 12/2013 |
| WO | 2013/178552 A1 | | 12/2013 |
| WO | WO-2013178550 | ‡ | 12/2013 |
| WO | WO-2013178552 | ‡ | 12/2013 |
| WO | WO-2016/049452 A1 | ‡ | 3/2016 |
| WO | WO-2017/009417 A1 | ‡ | 1/2017 |

OTHER PUBLICATIONS

International Search Report for International application No. PCT/US2018/032299 dated Aug. 22, 2018, 3 pages.‡

International Written Opinion for International application No. PCT/US2018/032299 dated Aug. 22, 2018, 11 pages.‡

Correa et al., Microstructure and Mecanical Properties of WC Ni—Si Based Cemented Carbides Developed by Powder Metallurgy, International Journal of Refractory Metals and Hard Materials, vol. 28, Issue 5, (Sep. 2010), pp. 572-575.‡

Kruth et al., Lasers and Materials in Selective Laser Sintering, Assembly Automation, vol. 23, Issue 4, (2003), pp. 357-371.‡

Andreeve et al., Features of the Influence of Nanomodivication and Macrostructureization on the Properties of the Fe—Mo Binder for a Didamond Tool, Russian Journal of Non Ferrous Metals, vol. 55, No. 6, (Nov. 2014), pp. 82-86.‡

Zaitzev et al., Diamond Tools in Metal Bonds Dispersion Strengthened with Nanosized Particles for Cutting Highly Reinforced Concrete, Journal of Superhard Materials, vol. 32, No. 6, (Dec. 2010), pp. 423-431.‡

Sidorenko et al., Interaction of Diamond Grains with Nanosized Alloying Agents in Metal-Matrix Composites a Studied by Raman Spectroscopy, Diamond & Related Materials, vol. 38,, (Sep. 2013), pp. 59-62.‡

Kimura et al., Phase Equilibria in the T-A1-C (T: Co, Ni, Rh, Ir) and T-Al—B (T: Rh, Ir) Systems for the Design of E21-Co3AlC Based Heat Resistant Alloys, Intermetallics, vol. 14, Issue 5, May 2006, pp. 508-514. (Abstract only).‡

Kimura et al., Phase Stability and Relations of Multi-phase Alloys Based on B2 CoAl and E21 Co2AlC, Intermetallics, vol. 3, Issue 5, 1995, pp. 413-425. (Abstract only).‡

(56) References Cited

OTHER PUBLICATIONS

Akaishi et al., Material Science and Engineering A (1988), vol. 05/106, 1 and 2 (Abstract only).‡

German, R.M., "The Contiguity of Liquid Phase Sintered Microstructures," Metallurgical Transactions A, vol. 16A, Jul. 1985, pp. 1247-1252.‡

Akaishi et al., "Thermal Properties of Sintered Diamond with Small Amounts of Metal," Science and Technology of New Diamond, (1990) pp. 129-134.‡

Metals Handbook, 8th Ed, vol. 2, American Society for Metals, 1964, pp. 93-114.‡

Gupta, K.P.; "The Co—Cr—W (cobalt-Chromium-Tungsten) System", Journal of Phase Equilibria and Diffusion, vol. 24, No. 2, Apr. 1, 2006 pp. 178-183.‡

European Search Report and Opinion for European Application No. 17760799 dated Sep. 26, 2019, 9 pages.‡

European Search Report and Search Opinion Received for EP Application No. 18799295, dated on Jan. 21, 2021, 7 pages.‡

Canadian Office Action for Canadian Application No. 3,063,097, dated Mar. 31, 2021, 4 pages, with English translation.‡

Chinese Office Action, from Chinese Application No. 201880044364.6, dated May 24, 2021, 15 pages.‡

Canadian Office Action for Canadian Application No. 3,063,097 dated Jul. 5, 2021, 3 pages.‡

Chinese Second Office Action for Chinese Application No. 201780024446.X, dated Oct. 10, 2020, 20 pages, with English Translation.

Kimura et al., Phase Equilibria in the T-A1-C (T: Co, Ni, Rh, Ir) and T-Al—B (T: Rh, Ir) Systems for the Design of E21-Co3AIC Based Heat Resistant Alloys, Intermetallics, vol. 14, Issue 5, May 2006, pp. 508-514. (Abstract only).

Levashov et al., Improved Mechanical and Tribological Properties of Metal-Matrix Composites Dispersion-Strengthened by Nanoparticles, Materials, vol. 3, (2010), pp. 97-109.

Underwood, Quantitative Stereology, Addison-Wesley Publishing Company, Inc., 1970, pp. 103-105.

Canadian Office Action for Application No. 3,063,097 dated Feb. 11, 2022, 4 pages.

European Communication pursuant to Article 94(3) EPC for European Application No. 17760799, dated Apr. 21, 2021, 6 pages.

Andreeve et al., Features of the Influence of Nanomodivication and Macrostructureization on the Properties of the Fe—Mo Binder for a Didamond Tool, Russian Journal of Non Ferrous Metals, vol. 55, No. 6, (Nov. 2014), pp. 32-86.

Chinese Second Office Action for Chinese Application No. 201780024446, mailed on Jun. 1, 2020, 15 pages (9 pages of English Translation and 6 pages of Original Document).

Chinese Supplementary Search Report for Chinese Application No. 201780024446, mailed on Sep. 27, 2020, 1 page.

Underwood, Ervin E., "Quantitative Stereology", Addison-Wesley Publishing Company, Inc. Philippines copyright, (1970) 20 pages.

\* cited by examiner
‡ imported from a related application

METHODS OF FORMING CUTTING ELEMENTS

CROSS-REFERENCE TO RELATED APPLICATION

This application is a divisional of U.S. patent application Ser. No. 15/594,174, filed May 12, 2017, pending, now U.S. Pat. No. 11,292,750, issued Apr. 5, 2022, the disclosure of which is hereby incorporated herein in its entirety by this reference.

TECHNICAL FIELD

Embodiments of the disclosure relate to supporting substrates for cutting elements, and to related cutting elements, structures, earth-boring tools, and methods of forming the supporting substrates and cutting elements.

BACKGROUND

Earth-boring tools for forming wellbores in subterranean earth formations may include a plurality of cutting elements secured to a body. For example, fixed-cutter earth-boring rotary drill bits ("drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. Other earth-boring tools utilizing cutting elements include, for example, core bits, bi-center bits, eccentric bits, hybrid bits (e.g., rolling components in combination with fixed cutting elements), reamers, and casing milling tools.

The cutting elements used in such earth-boring tools often include a volume of polycrystalline diamond ("PCD") material on a substrate. Surfaces of the polycrystalline diamond act as cutting faces of the so-called polycrystalline diamond compact ("PDC") cutting elements. PCD material is material that includes inter-bonded grains or crystals of diamond material. In other words, PCD material includes direct, inter-granular bonds between the grains or crystals of diamond material. The terms "grain" and "crystal" are used synonymously and interchangeably herein.

PDC cutting elements are generally formed by sintering and bonding together relatively small diamond (synthetic, natural or a combination) grains, termed "grit," under conditions of high temperature and high pressure in the presence of a catalyst (e.g., cobalt, iron, nickel, or alloys and mixtures thereof) to form one or more layers (e.g., a "compact" or "table") of PCD material. These processes are often referred to as high temperature/high pressure (or "HTHP") processes. The supporting substrate may comprise a cermet material (i.e., a ceramic-metal composite material) such as, for example, cobalt-cemented tungsten carbide. In some instances, the PCD material may be formed on the cutting element, for example, during the HTHP process. In such instances, catalyst material (e.g., cobalt) in the supporting substrate may be "swept" into the diamond grains during sintering and serve as a catalyst material for forming the diamond table from the diamond grains. Powdered catalyst material may also be mixed with the diamond grains prior to sintering the grains together in an HTHP process. In other methods, the diamond table may be formed separately from the supporting substrate and subsequently attached thereto.

Upon formation of the diamond table using an HTHP process, catalyst material may remain in interstitial spaces between the inter-bonded grains of the PDC. The presence of the catalyst material in the PDC may contribute to thermal damage in the PDC when the PDC cutting element is heated during use due to friction at the contact point between the cutting element and the formation. Accordingly, the catalyst material (e.g., cobalt) may be leached out of the interstitial spaces using, for example, an acid or combination of acids (e.g., aqua regia). Substantially all of the catalyst material may be removed from the PDC, or catalyst material may be removed from only a portion thereof, for example, from a cutting face of the PDC, from a side of the PDC, or both, to a desired depth. However, a fully leached PDC is relatively more brittle and vulnerable to shear, compressive, and tensile stresses than is a non-leached PDC. In addition, it is difficult to secure a completely leached PDC to a supporting substrate.

BRIEF SUMMARY

Embodiments described herein include supporting substrates for cutting elements, and related cutting elements, structures, earth-boring tools, and methods of forming the supporting substrates and the cutting elements. For example, in accordance with one embodiment described herein, a method of forming a supporting substrate for a cutting element comprises forming a precursor composition comprising discrete WC particles, a binding agent, and discrete particles comprising Co, Al, and one or more of C and W. The precursor composition is subjected to a consolidation process to form a consolidated structure including WC particles dispersed in a homogenized binder comprising Co, Al, W, and C.

In additional embodiments, a method of forming a cutting element comprises providing a supporting substrate comprising WC particles dispersed within a homogenized binder comprising Co, Al, W, and C. A powder comprising diamond particles is deposited directly on the supporting substrate. The supporting substrate and the powder are subjected to elevated temperatures and elevated pressures to diffuse a portion of the homogenized binder of the supporting substrate into the powder and inter-bond the diamond particles. Portions of the homogenized binder within interstitial spaces between the inter-bonded diamond particles are converted into a thermally stable material comprising κ-carbide precipitates.

In further embodiments, a cutting element comprises a supporting substrate comprising WC particles dispersed in a homogenized binder comprising Co, Al, W, and C. A cutting table is directly attached to an end of the supporting substrate and comprises inter-bonded diamond particles, and a thermally stable material within interstitial spaces between the inter-bonded diamond particles. The thermally stable material comprises κ-carbide precipitates.

In yet further embodiments, a structure comprises a consolidated structure and a hard material structure directly attached to the consolidated structure. The consolidated structure comprises WC particles dispersed in a homogenized binder comprising Co, Al, W, and C. The hard material structure comprises inter-bonded diamond particles and a thermally stable material within interstitial spaces between the inter-bonded diamond particles. The thermally stable material comprises κ-carbide precipitates.

DETAILED DESCRIPTION

Figure 1:
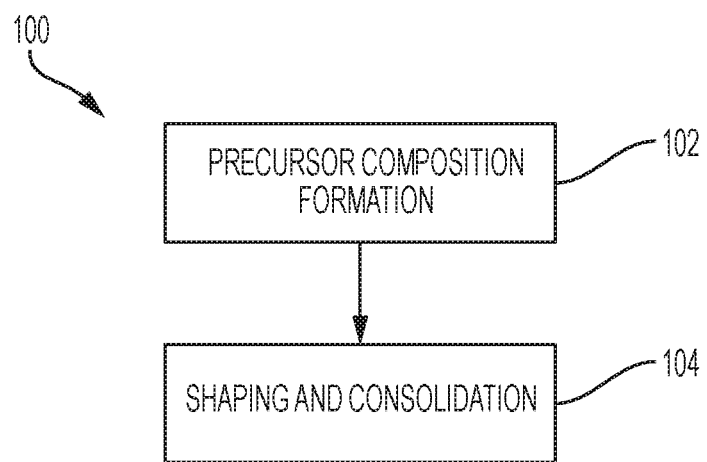
FIG. 1 is a simplified flow diagram depicting a method of forming a supporting substrate for a cutting element, in accordance with embodiments of the disclosure.

The following description provides specific details, such as specific shapes, specific sizes, specific material compositions, and specific processing conditions, in order to provide a thorough description of embodiments of the present disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing a cutting element or earth-boring tool. Only those process acts and structures necessary to understand the embodiments of the disclosure are described in detail below. Additional acts to form a complete cutting element or a complete earth-boring tool from the structures described herein may be performed by conventional fabrication processes.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "comprising," "including," "having," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be excluded.

As used herein, spatially relative terms, such as "below," "lower," "bottom," "above," "over," "upper," "top," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "over" or "above" or "on" or "on top of" other elements or features would then be oriented "below" or "beneath" or "under" or "on bottom of" the other elements or features. Thus, the term "over" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "configured" refers to a size, shape, material composition, material distribution, orientation, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

As used herein, the term "about" in reference to a given parameter is inclusive of the stated value and has the meaning dictated by the context (e.g., it includes the degree of error associated with measurement of the given parameter).

As used herein, the terms "earth-boring tool" and "earth-boring drill bit" mean and include any type of bit or tool used for drilling during the formation or enlargement of a wellbore in a subterranean formation and include, for example, fixed-cutter bits, roller cone bits, percussion bits, core bits, eccentric bits, bi-center bits, reamers, mills, drag bits, hybrid bits (e.g., rolling components in combination with fixed cutting elements), and other drilling bits and tools known in the art.

As used herein, the term "polycrystalline compact" means and includes any structure comprising a polycrystalline material formed by a process that involves application of pressure (e.g., compaction) to the precursor composition or materials used to form the polycrystalline material. In turn, as used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., covalent, metallic, etc.) between atoms in adjacent grains of hard material.

As used herein, the term "hard material" means and includes any material having a Knoop hardness value of greater than or equal to about 3,000 $Kg_f/mm^2$ (29,420 MPa). Non-limiting examples of hard materials include diamond (e.g., natural diamond, synthetic diamond, or combinations thereof), and cubic boron nitride.

As used herein, the term "catalytic cobalt" means and includes the catalytic crystalline form of cobalt (Co). In turn, the "catalytic crystalline form" of Co refers to disordered face-centered-cubic (FCC) gamma ($\gamma$) phase (FCC ($\gamma$)) Co. FCC ($\gamma$) Co exhibits a "disordered" configuration when Co atoms of the FCC lattice are substituted with other (e.g., replacement) atoms at irregular positions. In contrast, FCC ($\gamma$) Co exhibits an "ordered" configuration when Co atoms of the FCC lattice are substituted with other atoms at regular positions. Detection of whether FCC ($\gamma$) Co exhibits a disordered configuration or an ordered configuration can be demonstrated using X-ray diffraction techniques or in detection of magnetic phases.

FIG. 1 is a simplified flow diagram illustrating a method 100 of forming a supporting substrate for a cutting element, in accordance with embodiments of the disclosure. As described in further detail below, the method 100 includes a precursor composition formation process 102, and a consolidation process 104. With the description as provided below, it will be readily apparent to one of ordinary skill in the art that the methods described herein may be used in various applications. The methods of the disclosure may be used whenever it is desired to form a consolidated structure including particles of a hard material dispersed in a homogenized binder.

Referring to FIG. 1, the precursor composition formation process 102 includes combining (e.g., mixing) a preliminary powder including cobalt (Co), aluminum (Al), and one or more of carbon (C) and tungsten (W) with a tungsten carbide (WC) powder, a binding agent, and, optionally, one or more additive(s) to form a precursor composition. The preliminary powder may, for example, comprise discrete alloy particles (e.g., discrete Co—Al—C alloy particles, discrete Co—Al—W alloy particles) and/or discrete elemental (e.g., non-alloy) particles (e.g., discrete elemental Co particles, discrete elemental Al particles, discrete C particles, discrete W particles). During the precursor composition formation process 102, the discrete particles (e.g., discrete alloy particles and/or discrete elemental particles) of the preliminary powder may be distributed relative to the discrete WC particles of the WC powder and the additive(s) (if any) so as to facilitate the formation of a consolidated structure (e.g., a supporting substrate) able to effectuate the formation of a cutting element including a thermally stable cutting table (e.g., a thermally stable PDC table), as described in further detail bellow.

The preliminary powder may include any amounts of Co, Al, and one or more C and W able to facilitate the formation of a consolidated structure formed of and including WC particles and a homogenized binder including desired amounts of Co, Al, W, and C (as well as individual element (s) of the additive(s), if any) through the consolidation process 104. Accordingly, amounts of Co, Al, and one or more of C and W in the preliminary powder (e.g., as effectuated by the formulations and relative amounts of the discrete alloy particles and/or the discrete elemental particles thereof) may be selected at least partially based on amounts of W and C in the WC powder (e.g., as effectuated by the formulations and relative amounts of the discrete WC particles thereof) and amounts of the additive(s) (if any) facilitating the formation of the homogenized binder of the consolidated structure. In turn, as described in further detail below, a material composition of the homogenized binder (including the relative amounts of Co, Al, W, C, and any other element(s) therein) may be selected at least partially based on desired melting properties of the homogenized binder, on desired catalytic properties of the homogenized binder for the formation of a compact structure (e.g., a cutting table, such as a PDC table) including inter-bonded diamond particles, and on desired thermal stability properties of the compact structure effectuated by the formation of a thermally stable material from portions of the homogenized binder remaining within interstitial spaces between the inter-bonded diamond particles following the formation thereof.

By way of non-limiting example, the preliminary powder may include from about one (1) weight percent (wt %) Al to about 15.0 wt % Al, from about 83 wt % Co to about to 98.75 wt % Co, and from about 0.25 wt % C to about 2.0 wt % C. Relatively higher concentrations of Al in the preliminary powder may, for example, enhance thermal stability properties of a compact structure (e.g., a cutting table, such as a PDC table) formed using a homogenized binder (e.g., a homogenized Co—Al—C—W alloy binder) subsequently formed from the precursor composition, but may also increase and/or widen the melting temperature range of the homogenized binder relative to homogenized binders having relatively lower Al concentrations. Relatively higher concentrations of Co in the preliminary powder may, for example, enhance the catalytic properties (e.g., carbon solubility and liquid phase transport) of the subsequently formed homogenized binder for the formation of inter-bonded diamond particles, but may also decrease the thermal stability of the compact structure formed using the homogenized binder due to back-conversion of the inter-bonded diamond particles to other forms or phases of carbon facilitated by excess (e.g., unreacted) catalytic Co present within the compact structure during use and operation thereof. Relatively higher concentrations of C in the preliminary powder may, for example, enhance thermal stability properties of the compact structure formed by the homogenized binder through the formation of carbide precipitates. Elevated C level may modify (e.g., suppress) the melting characteristics of the homogenized binder by modifying the melting and solidification paths toward monovarient and invariant reaction lines.

In some embodiments, the material composition of the preliminary powder is selected relative to the material composition of WC powder and any additive(s) to minimize amounts of catalytic Co within interstitial spaces of a compact structure (e.g., a cutting table, such as a PDC table) to be formed using a homogenized binder subsequently formed from the precursor composition. For example, the preliminary powder may include amounts of Al and one or more of C and W which, in combination with other elements from the WC powder and the additive(s) (if any), facilitate the formation of a homogenizing binder (e.g., a homogenized Co—Al—C—W alloy binder) including a sufficient amount of Co to facilitate the formation of a compact structure including inter-bonded diamond particles without having any catalytic Co remain within interstitial spaces of the compact structure following the formation thereof. The material composition of the preliminary powder may, for example, be selected to facilitate the complete (e.g., 100 percent) reaction of catalytic Co resulting from the infiltration of the homogenized binder into a volume of hard material (e.g., a volume of diamond powder). The amounts of Co, Al, and one or more of C and W in the preliminary powder may also be selected to permit a melting temperature range of the subsequently-formed homogenized binder to be within a temperature range suitable for thermally treating (e.g., sintering) the volume of hard material to form the compact structure. In some embodiments, the preliminary powder includes about 86 wt % Co, about 13 wt % Al, and about 0.9 wt % C.

In additional embodiments, the material composition of the preliminary powder is selected relative to the material compositions of the WC powder and any additive(s) to facilitate the subsequent formation of a homogenized binder having a relatively lower melting temperature range and/or relatively narrower melting temperature range than a homogenized binder formulated to minimize the amounts of catalytic Co remaining within interstitial spaces of a compact structure to be formed using the homogenized binder. The material composition of the preliminary powder may facilitate the partial reaction (e.g., less than 100 percent, such as less than or equal to 90 percent, less than or equal to 80 percent, or less than or equal to 70 percent) of catalytic Co resulting from the infiltration of the homogenized binder into a volume of hard material (e.g., a volume of diamond powder). Accordingly, the compact structure may include catalytic Co within interstitial spaces thereof. However, the inter-bonded diamond particles of the compact structure may be at least partially protected from the catalytic Co by one or more other materials (e.g., intermetallic compound precipitates, carbide precipitates, etc.), as described in further detail below. In some embodiments, the preliminary powder includes about 89 wt % Co, about 9.2 wt % Al, and about 0.8 wt % C.

In some embodiments, at least some (e.g., all) of the discrete particles of the preliminary powder comprise discrete alloy particles individually formed of and including an alloy of Co, Al, and one or more of C and W. For example, at least some (e.g., all) of the discrete particles of the preliminary powder may comprise discrete Co—Al—C alloy particles individually formed of and including an alloy of Co, Al, and C, and/or at least some (e.g., all) of the discrete particles of the preliminary powder may comprise discrete Co—Al—W alloy particles individually formed of and including an alloy of Co, Al, and W. Each of the discrete alloy particles may include substantially the same components (e.g., Co, Al, and one or more of C and W) and component ratios of as each other of the discrete alloy particles, or one or more of the discrete alloy particles may include different components and/or different component ratios than one or more other of the preliminary alloy particles, so long as the preliminary powder as a whole includes desired and predetermined ratios of Co, Al, and one or more of C and W. In some embodiments, the preliminary powder is formed of and includes discrete Co—Al—C alloy particles having substantially the same amounts of Co, Al, and C as one another. In additional embodiments, the preliminary powder is formed of and includes discrete Co—Al—C alloy particles having different amounts of two or more of Co, Al, and C than one another. In further embodiments, the preliminary powder is formed of and includes discrete Co—Al—W alloy particles having substantially the same amounts of Co, Al, and W as one another. In yet further embodiments, the preliminary powder is formed of and includes discrete Co—Al—W alloy particles having different amounts of two or more of Co, Al, and W than one another. In still further embodiments, the preliminary powder is formed of and includes discrete Co—Al—C alloy particles and discrete Co—Al—W alloy particles, wherein the discrete Co—Al—C alloy particles have substantially the same or different amounts of Co, Al, and C as one another and the discrete Co—Al—W alloy particles have substantially the same or different amounts of Co, Al, and W as one another.

If included in the preliminary powder, the discrete alloy particles (e.g., discrete Co—Al—C alloy particles and/or discrete Co—Al—W alloy particles) may be formed by conventional processes (e.g., ball milling processes, attritor milling processes, cryomilling processes, jet milling processes, powder atomization processes, etc.), which are not described herein. As a non-limiting example, an initial powder formed of and including particles of Co, Al, and one or more C (e.g., lamp black, graphite, etc.) and W, alloys thereof, and/or combinations thereof may be provided into an attritor mill containing mixing structures (e.g., mixing spheres, mixing bars, etc.), and may then be subjected to a mechanical alloying process until the discrete alloy particles are formed. During the mechanical alloying process collisions between the mixing structures and the initial powder may cause particles of different materials (e.g., Co particles, Al particles, graphite particles, W particles, alloy particles, combinations thereof, etc.) to fracture and/or be welded or smeared together. Relatively larger particles may fracture during the mechanical welding process and relatively smaller particles may weld together, eventually forming discrete alloy particles each individually comprising a substantially homogeneous mixture of the constituents of the initial powder in substantially the same proportions of the initial powder. As another non-limiting example, an alloy material may be formed by conventional melting and mixing processes, and then the alloy material may be formed into the discrete alloy particles by one or more conventional atomization processes.

In additional embodiments, at least some (e.g., all) of the discrete particles of the preliminary powder comprise discrete elemental particles, such as one or more discrete elemental Co particles, discrete elemental Al particles, and discrete C particles (e.g., discrete graphite particles, discrete graphene particles, discrete fullerene particles, discrete carbon nanofibers, discrete carbon nanotubes, etc.), and discrete elemental W particles. The preliminary powder may include any amounts of the discrete elemental Co particles, the discrete elemental Al particles, the discrete C particles, and the discrete elemental W particles permitting the preliminary powder as a whole to include desired and predetermined ratios of Co, Al, C, and W. If included in the preliminary powder, the discrete elemental particles (e.g., discrete elemental Co particles, discrete elemental Al particles, discrete C particles, discrete elements W particles) may be formed by conventional processes (e.g., conventional milling processes), which are not described herein.

The preliminary powder may include discrete alloy particles (e.g., discrete Co—Al—C alloy particles and/or discrete Co—Al—W particles) but may be substantially free of discrete elemental particles (e.g., discrete elemental Co particles, discrete elemental Al particles, discrete C particles, and discrete elemental W particles); may include discrete elemental particles (e.g., discrete elemental Co particles, discrete elemental Al particles, and one or more of discrete C particles and discrete elemental W particles) but may be substantially free of discrete alloy particles (e.g., discrete Co—Al—C alloy particles and discrete Co—Al—W particles); or may include a combination of discrete alloy particles (e.g., discrete Co—Al—C alloy particles and/or discrete Co—Al—W alloy particles) and discrete elemental particles (e.g., one or more of discrete elemental Co particles, discrete elemental Al particles, discrete C particles, and discrete elemental W particles). In some embodiments, the preliminary powder only includes discrete Co—Al—C alloy particles. In additional embodiments, the preliminary powder only includes discrete elemental Co particles, discrete elemental Al particles, and discrete C particles. In yet additional embodiments, the preliminary powder only includes discrete Co—Al—W alloy particles. In still additional embodiments, the preliminary powder only includes discrete elemental Co particles, discrete elemental Al particles, and discrete elemental W particles. In yet still additional embodiments, the preliminary powder includes discrete Co—Al—C alloy particles, and one or more (e.g., each) of discrete elemental Co particles, discrete elemental Al particles, and discrete C particles. In further embodiments, the preliminary powder includes discrete Co—Al—W alloy particles, and one or more (e.g., each) of discrete elemental Co particles, discrete elemental Al particles, and discrete elemental W particles. In yet further embodiments, the preliminary powder only includes discrete Co—Al—W alloy particles and discrete Co—Al—C alloy particles. In still further embodiments, the preliminary powder includes discrete Co—Al—W alloy particles, discrete Co—Al—C alloy particles, and one or more (e.g., each) of discrete elemental Co particles, discrete elemental Al particles, discrete C particles, and discrete elemental W particles.

Each of the discrete particles (e.g., discrete alloy particles and/or discrete elemental particles) of the preliminary powder may individually exhibit a desired particle size, such as a particle size less than or equal to about 1000 micrometers (μm). The discrete particles may comprise, for example, one or more of discrete micro-sized composite particles and discrete nano-sized composite particles. As used herein, the term "micro-sized" means and includes a particle size with a range of from about one (1) μm to about 1000 μm, such as from about 1 μm to about 500 μm, from about 1 μm to about 100 μm, or from about 1 μm to about 50 μm. As used herein, the term "nano-sized" means and includes a particle size of less than 1 μm, such as less than or equal to about 500 nanometers (nm), or less than or equal to about 250 nm. In addition, each of the discrete particles may individually exhibit a desired shape, such as one or more of a spherical shape, a hexahedral shape, an ellipsoidal shape, a cylindrical shape, a conical shape, or an irregular shape.

The discrete particles (e.g., discrete alloy particles and/or discrete elemental particles) of the preliminary powder may be monodisperse, wherein each of the discrete particles exhibits substantially the same size and substantially the same shape, or may be polydisperse, wherein at least one of the discrete particles exhibits one or more of a different particle size and a different shape than at least one other of the discrete particles. In some embodiments, the discrete particles of the preliminary powder have a multi-modal (e.g., bi-modal, tri-modal, etc.) particle (e.g., grain) size distribution. For example, the preliminary powder may include a combination of relatively larger, discrete particles and relatively smaller, discrete particles. The multi-modal particle size distribution of the preliminary powder may, for example, provide the precursor composition with desirable particle packing characteristics for the subsequent formation of a consolidated structure (e.g., supporting substrate) therefrom, as described in further detail below. In additional embodiments, the preliminary powder has a mono-modal particle size distribution. For example, all of the discrete particles of the preliminary powder may exhibit substantially the same particle size.

The WC particles of the WC powder may include stoichiometric quantities or near stoichiometric quantities of W and C. Relative amounts of W and C in the discrete WC particles may be selected at least partially based on amounts and material compositions of the discrete particles of the preliminary powder, the discrete WC particles, and the additive(s) (if any) facilitating the formation of a consolidated structure (e.g., supporting substrate) formed of and including WC particles and a homogenized binder including desirable and predetermined amounts of Co, Al, W, and C (as well as individual elements of additive(s), if any) through the consolidation process 104. In some embodiments, each of the discrete WC particles of the WC powder includes stoichiometric amounts of W and C. In additional embodiments, one or more of the discrete WC particles of the WC powder include an excess amount of C than that stoichiometrically required to form WC. In further embodiments, one or more of the discrete WC particles of the WC powder includes an excess amount of W than that stoichiometrically required to form WC.

Each of the discrete WC particles of the WC powder may individually exhibit a desired particle size, such as a particle size less than or equal to about 1000 μm. The discrete WC particles may comprise, for example, one or more of discrete micro-sized WC particles and discrete nano-sized WC particles. In addition, each of the discrete WC particles may individually exhibit a desired shape, such as one or more of a spherical shape, a hexahedral shape, an ellipsoidal shape, a cylindrical shape, a conical shape, or an irregular shape.

The discrete WC particles of the WC powder may be monodisperse, wherein each of the discrete WC particles exhibits substantially the same size and shape, or may be polydisperse, wherein at least one of the discrete WC particles exhibits one or more of a different particle size and a different shape than at least one other of the discrete WC particles. In some embodiments, the WC powder has a multi-modal (e.g., bi-modal, tri-modal, etc.) particle (e.g., grain) size distribution. For example, the WC powder may include a combination of relatively larger, discrete WC particles and relatively smaller, discrete WC particles. In additional embodiments, the WC powder has a mono-modal particle size distribution. For example, all of the discrete WC particles of the WC powder may exhibit substantially the same particle size.

The WC powder, including the discrete WC particles thereof, the may be formed by conventional processes, which are not described herein.

The binding agent may comprise any material permitting the precursor composition to retain a desired shape during subsequent processing, and which may be removed (e.g., volatilized off) during the subsequent processing. By way of non-limiting example, the binding agent may comprise an organic compound, such as a wax (e.g., a paraffin wax). In some embodiments, the binding agent of the precursor composition is a paraffin wax.

The additive(s), if present, may comprise any material(s) formulated to impart a consolidated structure (e.g., supporting substrate) subsequently formed from the precursor composition with one or more desirable material properties (e.g., fracture toughness, strength, hardness, hardenability, wear resistance, coefficient of thermal expansions, thermal conductivity, corrosion resistance, oxidation resistance, ferromagnetism, etc.), and/or that impart a homogenized binder of the subsequently formed consolidated structure with a material composition facilitating the formation of a compact structure (e.g., a cutting table, such as a PDC table) having desired properties (e.g., wear resistance, impact resistance, thermal stability, etc.) using the consolidated structure. By way of non-limiting example, the additive(s) may comprise one or more elements of one or more of Group IIIA (e.g., boron (B), aluminum (Al)); Group IVA (e.g., carbon (C)); Group IVB (e.g., titanium (Ti), zirconium (Zr), hafnium (Hf)); Group VB (e.g., vanadium (V), niobium (Nb), tantalum (Ta)); Group VIB (e.g., chromium (Cr), molybdenum (Mo), tungsten (W)); Group VIIB (e.g., manganese (Mn), rhenium (Re)); Group VIIIB (e.g., iron (Fe), ruthenium (Ru), cobalt (Co), rhodium (Rh), iridium (Ir), nickel (Ni)); Group IB (e.g., copper (Cu), Silver (Ag), gold (Au)); and Group IIB (e.g., zinc (Zn), cadmium (Cd)) of the Periodic Table of Elements. In some embodiments, the additive(s) comprise discrete particles each individually including one or more of B, Al, C, Ti, Zr, Hf, V, Nb, Ta, Cr, Mo, W, Mn, Re, Fe, Ru, Co, Rh, Ir, Ni, Cu, Ag, Au, Zn, and Cd.

Amounts of the preliminary powder, the WC powder, the binding agent, and the additive(s) (if any) employed to form the precursor composition may be selected at least partially based on the configurations (e.g., material compositions, sizes, shapes) of the preliminary powder, the WC powder, and the additive(s) (if any) facilitating the formation of a consolidated structure formed of and including WC particles and a homogenized binder including desired and predetermined amounts of Co, Al, W, and C (as well as individual element(s) of the additive(s), if any) through the consolidation process 104. As a non-limiting example, the precursor composition may comprise from about 5 wt % to about 15 wt % of the preliminary powder, from about 85 wt % to about 95 wt % of the WC powder, from about 0 wt % to about 5 wt % of the additive(s), and a remainder of the binding agent (e.g., paraffin wax). If the preliminary powder only includes discrete Co—Al—C particles, the precursor composition may, for example, include from about 5 wt % to about 15 wt % discrete preliminary particles, from about 85 wt % to about 95 wt % discrete WC particles, from about 0 wt % to about 5 wt % additive(s), and a remainder of a binding agent. If the preliminary powder only includes discrete elemental Co particles, discrete elemental Al particles, and discrete C particles, the precursor composition may, for example, include from about 4 wt % to about 15 wt % discrete elemental Co particles, from about 0.05 wt % to about 3 wt % discrete elemental Al particles, from about 0.013 wt % to about 0.3 wt % discrete C particles, from about 85 wt % to about 95 wt % discrete WC particles, from about 0 wt % to about 5 wt % additive(s), and a remainder of a binding agent. In some embodiments, the precursor composition comprises about 12 wt % Co—Al—C particles, and about 88 wt % discrete WC particles. In additional embodiments, the precursor composition comprises about 10.3 wt % discrete elemental Co particles, about 1.6 wt % discrete elemental Al particles, about 0.1 wt % discrete C particles, and about 88 wt % discrete WC particles. In further embodiments, the precursor composition comprises about 10.7 wt % discrete elemental Co particles, about 1.2 wt % discrete elemental Al particles, about 0.1 wt % discrete C particles, and about 88 wt % discrete WC particles.

The precursor composition may be formed by mixing the preliminary powder, the WC powder, the binding agent, the additive(s) (if any), and at least one fluid material (e.g., acetone, heptane, etc.) formulated to dissolve and disperse the binding agent using one or more conventional processes (e.g., conventional milling processes, such as ball milling processes, attritor milling processes, cryomilling processes, jet milling processes, etc.) to form a mixture thereof. The preliminary powder, the WC powder, the binding agent, the additive(s) (if any), and the fluid material may be combined in any order. In some embodiments, the preliminary powder and the WC powder are combined (e.g., using a first milling process), and then the binding agent and fluid material are combined with the resulting mixture (e.g., using a second milling process). During the mixing process, collisions between different particles (e.g., the discrete particles of the preliminary powder, the discrete WC particles of the WC powder, the additive particles (if any), etc.) may cause at least some of the different particles to fracture and/or become welded or smeared together. For example, during the mixing process at least some materials (e.g., elements, alloys) of the discrete particles of the preliminary powder may be transferred to surfaces of the WC particles of the WC powder to form composite particles comprising WC coated with an alloy comprising Co, Al, and one or more of C and W. Thereafter, the fluid material may be removed (e.g., evaporated), leaving the binding agent on and around any remaining discrete particles of the preliminary powder, any remaining discrete WC particles of the WC powder, any composite particles (e.g., particles comprising WC coated with an alloy comprising Co, Al, and one or more of C and W), any remaining additive particles, and any other particles comprising constituents of the discrete particles of the preliminary powder, the discrete WC particles of the WC powder, and the additive(s).

With continued reference to FIG. 1, following the precursor composition formation process 102, the precursor composition is subjected to the consolidation process 104 to form a consolidated structure including WC particles dispersed within a homogenized binder. The homogenized binder may, for example, comprise a substantially homogeneous alloy of Co, Al, W, and C, as well as element(s) of one or more additive(s) (if any) present in the precursor composition. In some embodiments, the homogenized binder comprises a homogenized Co—Al—W—C alloy. Amounts of Co, Al, W, C, and other elements (if any) in the homogenized binder may at least partially depend on the amounts of Co, Al, W, C, and other elements (if any) included in the precursor composition. For example, the homogenized binder may include substantially the same amounts of at least Co and Al as the precursor composition, and modified amounts of at least W and C resulting from dissolution of W from the WC particles during the consolidation process 104 and the migration from and/or maintenance of C of different components (e.g., the Co—Al—C alloy particles, the WC particles, etc.) during the consolidation process 104.

The consolidated structure (e.g., supporting substrate) may be formed to exhibit any desired dimensions and any desired shape. The dimensions and shape of the consolidated structure may at least partially depend upon desired dimensions and desired shapes of a compact structure (e.g., a cutting table, such as a PDC table) to subsequently be formed on and/or attached to the consolidated structure, as described in further detail below. In some embodiments, the consolidated structure is formed to exhibit a cylindrical column shape. In additional embodiments, the consolidated structure is formed to exhibit a different shape, such as a dome shape, a conical shape, a frusto conical shape, a rectangular column shape, a pyramidal shape, a frusto pyramidal shape, a fin shape, a pillar shape, a stud shape, or an irregular shape. Accordingly, the consolidated structure may be formed to exhibit any desired lateral cross-sectional shape including, but not limited to, a circular shape, a semicircular shape, an ovular shape, a tetragonal shape (e.g., square, rectangular, trapezium, trapezoidal, parallelogram, etc.), a triangular shape, an elliptical shape, or an irregular shape.

The consolidation process 104 may include forming the precursor composition into green structure having a shape generally corresponding to the shape of the consolidated structure, subjecting the green structure to at least one densification process (e.g., a sintering process, a hot isostatic pressing (HIP) process, a sintered-HIP process, a hot pressing process, etc.) to form a consolidated structure including WC particles dispersed within an at least partially (e.g., substantially) homogenized binder, and, optionally, subjecting the consolidated structure to at least one supplemental homogenization process to further homogenize the at least partially homogenized binder. As used herein, the term "green" means unsintered. Accordingly, as used herein, a "green structure" means and includes an unsintered structure comprising a plurality of particles, which may be held together by interactions between one or more materials of the plurality of particles and/or another material (e.g., a binder).

The precursor composition may be formed into the green structure through conventional processes, which are not described in detail herein. For example, the precursor composition may be provided into a cavity of a container (e.g., canister, cup, etc.) having a shape complementary to a desired shape (e.g., a cylindrical column shape) of the consolidated structure, and then the precursor composition may be subjected to at least one pressing process (e.g., a cold pressing process, such as a process wherein the precursor composition is subjected to compressive pressure without substantially heating the precursor composition) to form the green structure. The pressing process may, for example, subject the precursor composition within the cavity of the container to a pressure greater than or equal to about 10 tons per square inch (tons/in$^2$), such as within a range of from about 10 tons/in$^2$ to about 30 tons/in$^2$.

Following formation the formation of the green structure, the binding agent may be removed from the green structure. For example, the green structure may be dewaxed by way of vacuum or flowing hydrogen at an elevated temperature. The resulting (e.g., dewaxed) structure may then be subjected to a partial sintering (e.g., pre-sintering) process to form a brown structure having sufficient strength for the handling thereof.

Following the formation of the brown structure, the brown structure may be subjected to a densification process (e.g., a sintering process, a hot isostatic pressing (HIP) process, a sintered-HIP process, a hot pressing process, etc.) that applies sufficient heat and sufficient pressure to the brown structure to form the consolidated structure including the WC particles dispersed in the at least partially homogenized binder. By way of non-limiting example, the brown structure may be wrapped in a sealing material (e.g., graphite foil), and may then be placed in a container made of a high temperature, self-sealing material. The container may be filled with a suitable pressure transmission medium (e.g., glass particles, ceramic particles, graphite particles, salt particles, metal particles, etc.), and the wrapped brown structure may be provided within the pressure transmission medium. The container, along with the wrapped brown structure and pressure transmission medium therein, may then be heated to a consolidation temperature facilitating the formation of the homogenized binder (e.g., the homogenized Co—Al—W—C alloy binder) under isostatic (e.g., uniform) pressure applied by a press (e.g., a mechanical press, a hydraulic press, etc.) to at least partially (e.g., substantially) consolidate the brown structure and form the consolidated structure. The consolidation temperature may be a temperature greater than the solidus temperature of at least the discrete particles (e.g., discrete alloy particles and/or discrete elemental particles) of the preliminary powder used to form the brown structure (e.g., a temperature greater than or equal to the liquidus temperature of the discrete particles, a temperature between the solidus temperature and the liquidus temperature of the discrete particles, etc.), and the applied pressure may be greater than or equal to about 10 megapascals (MPa) (e.g., greater than or equal to about 50 MPa, greater than or equal to about 100 MPa, greater than or equal to about 250 MPa, greater than or equal to about 500 MPa, greater than or equal to about 750 MPa, greater than or equal to about 1.0 gigapascals (GPa), etc.). During the densification process, one or more elements of the WC particles and/or additive(s) (if any) present in the brown structure may diffuse into and homogeneously intermix with molten Co—Al—C alloy to form the at least partially homogenized binder (e.g., homogenized Co—Al—W—C binder) of the consolidated structure.

As previously mentioned, following formation, the consolidated structure may be subjected to a supplemental homogenization process to further homogenize the at least partially homogenized binder thereof. If performed, the supplemental homogenization process may heat the consolidated structure to one or more temperatures above the liquidus temperature of the at least partially homogenized binder thereof for a sufficient period of time to reduce (e.g., substantially eliminate) macrosegregation within the at least partially homogenized binder and provide the resulting further homogenized binder with a single (e.g., only one) melting temperature. In some embodiments, such as in embodiments wherein the preliminary powder employed to form the consolidated structure comprises discrete elemental particles (e.g., discrete elemental Co particles, discrete elemental Al particles, discrete C particles, discrete elemental W particles) the at least partially homogenized binder of the consolidated structure may have multiple (e.g., at least two) melting temperatures following the densification process due to one or more regions of at least partially homogenized binder exhibiting different material composition(s) than one or more other regions of at least partially homogenized binder. Such different regions may, for example, form as a result of efficacy margins in source powder mixing and cold consolidation. In such embodiments, the supplemental homogenization process may substantially melt and homogenize the at least partially homogenized binder to remove the regions exhibiting different material composition(s) and provide the further homogenized binder with only one melting point. Providing the homogenized binder of the consolidated structure with only one melting point may be advantageous for the subsequent formation of a cutting table using the consolidated structure, as described in further detail below. In additional embodiments, such as in embodiments wherein the at least partially homogenized binder of the consolidated structure is already substantially homogeneous (e.g., does not include regions exhibiting different material composition(s) than other regions thereof) following the densification process, the supplemental homogenization process may be omitted.

Figure 19:
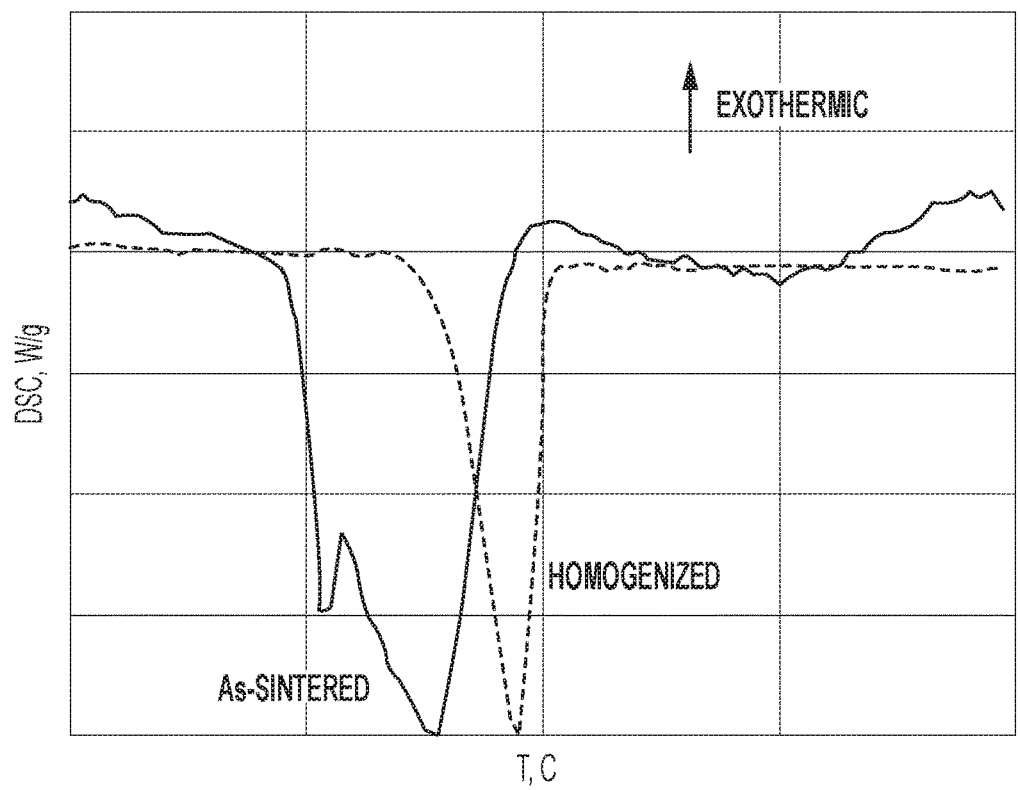
FIG. 19 is a graphical representation illustrating changes to a differential scanning calorimetry (DSC) curve of a partially homogenized binder facilitated through a supplemental homogenization process, in accordance with embodiments of the disclosure.

FIG. 19 is a graphical representation of differential scanning calorimetry (DSC) melting curves for a partially homogenized Co—Al—W—C alloy binder (i.e., the "as-sintered" DSC melting curve shown in FIG. 19) formed by sintering a precursor composition comprising 10.3 wt % discrete elemental Co particles, 1.6 wt % discrete elemental Al particles, 0.1 wt % discrete C particles, and 88 wt % discrete WC particles; and for a further homogenized Co—Al—W—C alloy binder (i.e., the "homogenized" DSC melting curve shown in FIG. 19) formed by subjecting the partially homogenized Co—Al—W—C alloy binder to a supplemental homogenization process. The partially homogenized Co—Al—W—C alloy binder was formed by subjecting the precursor composition to a densification process that included sintering the precursor composition at a temperature of about 1400° C. After cooling, the partially homogenized Co—Al—W—C alloy binder was subjected to a supplemental homogenization process that included re-heating the precursor composition to a temperature of about 1500° C. to form the further homogenized Co—Al—W—C alloy binder. As shown in FIG. 19, the partially homogenized Co—Al—W—C alloy binder exhibited two (2) distinct melting points, whereas the further homogenized Co—Al—W—C alloy binder exhibited only one (1) melting point.

Figure 2A:
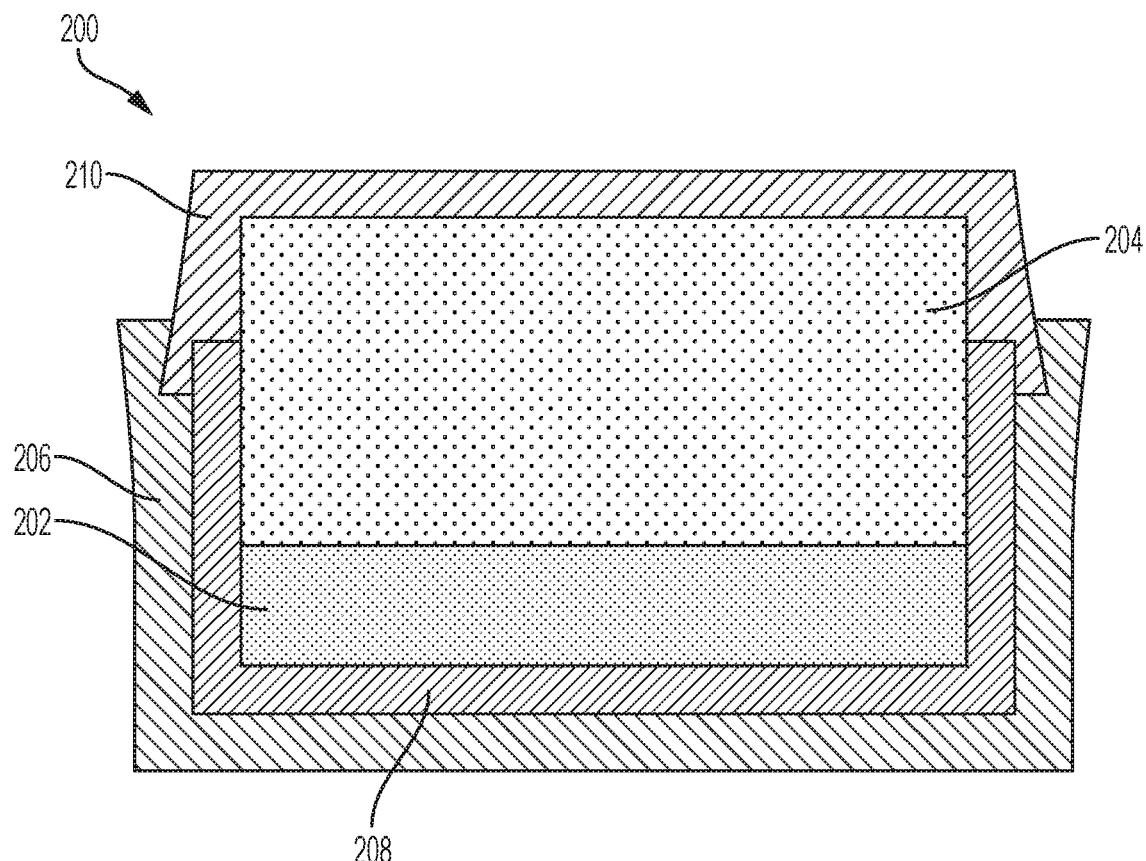
FIGS. 2A and 2B are simplified cross-sectional views of a container in a process of forming a cutting element, in accordance with embodiments of the disclosure.
Figure 2B:
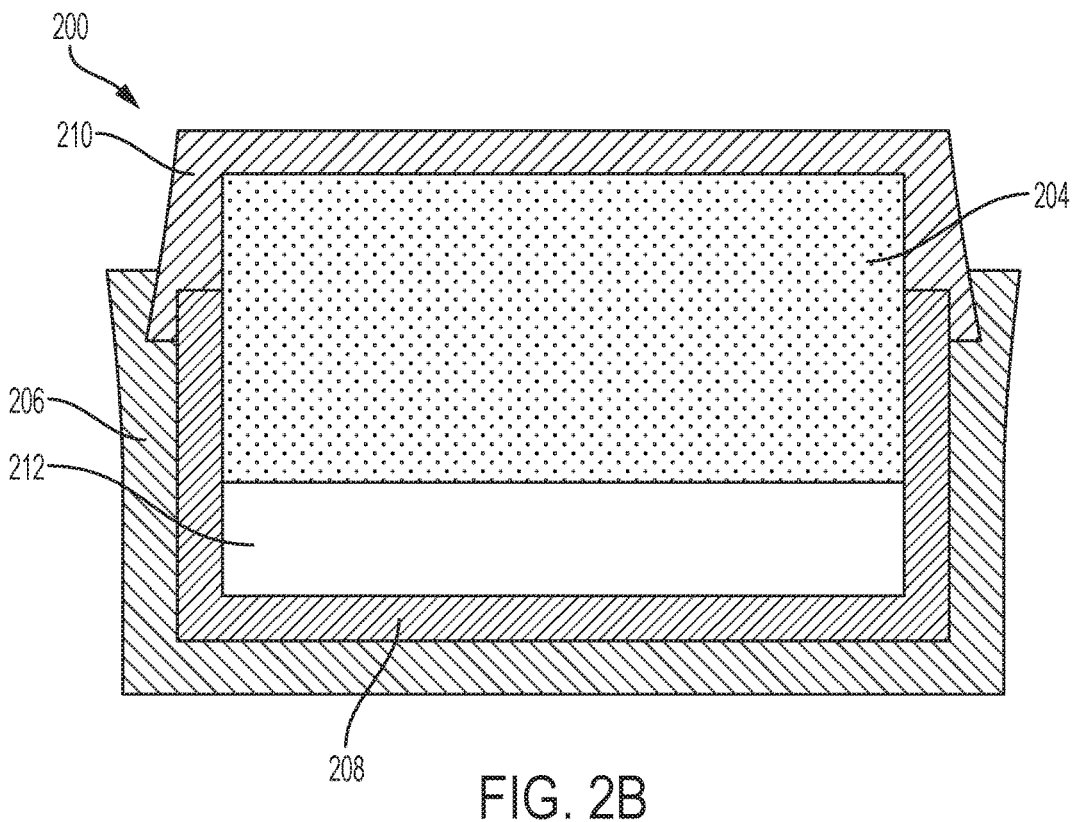

Consolidated structures (e.g., supporting substrates) formed in accordance with embodiments of the disclosure may be used to form cutting elements according to embodiments of the disclosure. For example, FIGS. 2A and 2B are simplified cross-sectional views illustrating embodiments of a method of forming a cutting element including a cutting table attached to a supporting substrate. With the description provided below, it will be readily apparent to one of ordinary skill in the art that the methods described herein may be used in various devices. In other words, the methods of the disclosure may be used whenever it is desired to form a cutting table, such as a diamond table (e.g., PDC table), of a cutting element.

Referring to FIG. 2A, a diamond powder 202 may be provided within the container 200, and a supporting substrate 204 may be provided directly on the diamond powder 202. The container 200 may substantially surround and hold the diamond powder 202 and the supporting substrate 204. As shown in FIG. 2A, the container 200 may include an inner cup 208 in which the diamond powder 202 and a portion of the supporting substrate 204 may be disposed, a bottom end piece 206 in which the inner cup 208 may be at least partially disposed, and a top end piece 210 surrounding the supporting substrate 204 and coupled (e.g., swage bonded) to one or more of the inner cup 208 and the bottom end piece 206. In additional embodiments, the bottom end piece 206 may be omitted (e.g., absent).

The diamond powder 202 may be formed of and include discrete diamond particles (e.g., discrete natural diamond particles, discrete synthetic diamond particles, combinations thereof, etc.). The discrete diamond particles may individually exhibit a desired grain size. The discrete diamond particles may comprise, for example, one or more of micro-sized diamond particles and nano-sized diamond particles. In addition, each of the discrete diamond particles may individually exhibit a desired shape, such as at least one of a spherical shape, a hexahedral shape, an ellipsoidal shape, a cylindrical shape, a conical shape, or an irregular shape. In some embodiments, each of the discrete diamond particles of the diamond powder 202 exhibits a substantially spherical shape. The discrete diamond particles may be monodisperse, wherein each of the discrete diamond particles exhibits substantially the same material composition, size, and shape, or may be polydisperse, wherein at least one of the discrete diamond particles exhibits one or more of a different material composition, a different particle size, and a different shape than at least one other of the discrete diamond particles. The diamond powder 202 may be formed by conventional processes, which are not described herein.

The supporting substrate 204 comprises a consolidated structure formed in accordance with the methods previously described herein with reference to FIG. 1. For example, the supporting substrate 204 may comprise a consolidated structure including WC particles dispersed within a homogenized binder (e.g., a substantially homogeneous alloy) comprising Co, Al, W, C, and, optionally, one or more other element(s). By way of non-limiting example, the consolidated structure may include from about 85 wt % to about 95 wt % WC particles, from about 5 wt % to about 15 wt % homogenized Co—Al—W—C binder, and from about 0 wt % to about 5 wt % of the additive(s). In some embodiments, the consolidated structure may include about 88 wt % WC particles, and about 12 wt % homogenized Co—Al—W—C binder. The homogenized Co—Al—W—C binder of the supporting substrate 204 may, for example, comprise from about 66 wt % Co to about 90 wt % Co, from about 5.0 wt % Al to about 15 wt % Al, from about 0.1 wt % C to about 0.2 wt % C, and from about 5.0 wt % W to about 30 wt % W.

Referring next to FIG. 2B, the diamond powder 202 (FIG. 2A) and the supporting substrate 204 may be subjected to HTHP processing to form a cutting table 212. The HTHP processing may include subjecting the diamond powder 202 and the supporting substrate 204 to elevated temperatures and elevated pressures in a directly pressurized and/or indirectly heated cell for a sufficient time to convert the discrete diamond particles of the diamond powder 202 into inter-bonded diamond particles. As described in further detail below, the operating parameters (e.g., temperatures, pressures, durations, etc.) of the HTHP processing at least partially depend on the material compositions of the supporting substrate 204 (including the material composition of the homogenized binder thereof) and the diamond powder 202. As a non-limiting example, temperatures within the heated, pressurized cell may be greater than the solidus temperature (e.g., greater than the solidus temperature and less than or equal to the liquidus temperature, greater than or equal to the liquidus temperature, etc.) of the homogenized binder of the supporting substrate 204, and pressures within the heated press may be greater than or equal to about 2.0 GPa (e.g., greater than or equal to about 3.0 GPa, such as greater than or equal to about 4.0 GPa, greater than or equal to about 5.0 GPa, greater than or equal to about 6.0 GPa, greater than or equal to about 7.0 GPa, greater than or equal to about 8.0 GPa, or greater than or equal to about 9.0 GPa). In addition, the diamond powder 202 and the supporting substrate 204 may be held at such temperatures and pressures for a sufficient amount of time to facilitate the inter-bonding of the discrete diamond particles of the diamond powder 202, such as a period of time between about 30 seconds and about 20 minutes.

During the HTHP processing, the homogenized binder of the supporting substrate 204 melts and a portion thereof is swept (e.g., mass transported, diffused) into the diamond powder 202 (FIG. 2A). As described in further detail below, the homogenized binder received by the diamond powder 202 catalyzes the formation of inter-granular bonds between the discrete diamond particles, and also facilitates the formation of a thermally stable material within interstitial spaces between the inter-bonded diamond particles of the cutting table 212. The thermally stable material may render the cutting table 212 thermally stable without needing to leach the cutting table 212. For example, the thermally stable material may not significantly promote carbon transformations (e.g., graphite-to-diamond or vice versa) as compared to conventional cutting tables including inter-bonded diamond particles substantially exposed to catalyst materials (e.g., catalytic Co) within interstitial spaces between the inter-bonded diamond particles. Accordingly, the intermetallic and carbide material may render the cutting table 212 more thermally stable than conventional cutting tables.

Since the diamond powder 202 (FIG. 2A) is provided directly on the supporting substrate 204, the types, amounts, and distributions of individual elements swept into the diamond powder 202 during the HTHP processing is substantially the same as the types, amounts, and distributions of individual elements of the homogenized binder of the supporting substrate 204. Put another way, the material composition (including the types, amounts, and distributions of the individual elements thereof) of the homogenized binder diffused into the diamond powder 202 during the HTHP processing to form the cutting table 212 is substantially the same as the material composition of homogenized binder within the supporting substrate 204 prior to the HTHP processing. For example, if the homogenized binder of the supporting substrate 204 comprises a ratio of Co to Al of about 9:1, a ratio of Co to Al swept into to the diamond powder 202 during the HTHP processing will also be about 9:1. Accordingly, providing the diamond powder 202 directly on the supporting substrate 204 may ensure that desired and predetermined sweep chemistries are provided into the diamond powder 202 during the HTHP processing.

In addition, providing the diamond powder 202 (FIG. 2A) directly on the supporting substrate 204 may reduce melting-point-based complexities associated with providing desired sweep chemistries into the diamond powder 202 during the HTHP processing as compared to configurations wherein a structure having a different material composition than the homogenized binder of the supporting substrate 204 is provided between the diamond powder 202 and the supporting substrate 204. For example, providing the diamond powder 202 directly on the supporting substrate 204 may permit a desired material composition (e.g., the material composition of the homogenized binder of the supporting substrate 204) to be swept into the diamond powder 202 using a single temperature (e.g., the melting temperature of the homogenized binder) and/or a relatively narrower temperature range, whereas providing a structure between the diamond powder 202 and the supporting substrate 204 require exposing the diamond powder 202, the structure, and the supporting substrate 204 to multiple temperatures (e.g., the melting temperature of the structure, and the melting temperature of the homogenized binder of the supporting substrate 204) and/or a relatively wider temperature range to permit a desired material composition (e.g., a combination of the material compositions of the structure and the homogenized binder of the supporting substrate 204) to be swept into the diamond powder 202 during the HTHP processing.

During the HTHP processing, the homogenized binder (e.g., homogenized Co—Al—W—C alloy binder) of the supporting substrate 204 diffuses into the diamond powder 202 (FIG. 2A) and catalyzes diamond nucleation and growth. At least the Co (as well as any other catalyzing elements, such as Fe and/or Ni) of the homogenized binder received by diamond powder 202 promotes the formation of the inter-bonded diamond particles of the cutting table 212. Depending on the amount of Co included in the homogenized binder, substantially all of the Co swept into the diamond powder 202 may be reacted during the formation of the cutting table 212, or only a portion of the Co swept into the diamond powder 202 may be reacted during the formation of the cutting table 212. The material composition of the homogenized binder of the supporting substrate 204 may be selected to control the amount of catalytic Co that remains following the formation of the cutting table 212. In some embodiments, the material composition of the homogenized binder is selected such that about 100 percent of the Co received by the diamond powder 202 is reacted during the formation of the cutting table 212. Thus, the cutting table 212 may be substantially free of catalytic Co capable of promoting carbon transformations (e.g., graphite-to-diamond or vice versa) during normal use and operation of the cutting table 212. In additional embodiments, the material composition of the homogenized binder is selected such that less than 100 percent (e.g., less than or equal to about 90 percent, less than or equal to about 80 percent, less than or equal to about 70 percent, less than or equal to about 60 percent, etc.) of the Co of the homogenized binder swept into the diamond powder 202 from the supporting substrate 204 is reacted during the formation of the cutting table 212. Thus, the cutting table 212 may include some catalytic Co. While such a material composition of the homogenized binder may permit the presence of catalytic Co in the cutting table 212, the material composition may provide the homogenized binder with desirable properties (e.g., lower melting temperatures, and/or smaller melting temperature ranges) and/or of one or more desired materials (e.g., desired carbide precipitates) within interstitial spaces of the cutting table 212. In addition, as described in further detail below, inter-bonded diamond particles of the cutting table 212 may be at least partially protected from any catalytic Co (e.g., by carbide precipitates, and/or other precipitates) during normal use and operation of the cutting table 212. The amount of Co in the homogenized binder of the supporting substrate 204 (and, hence, the amount of catalytic Co (if any) remaining in the cutting table 212 following the formation thereof) may be controlled (e.g., increased or decreased) by controlling the amounts of other elements (e.g., Al, W, C, additional elements, etc.) included in the homogenized binder. By way of non-limiting example, an increase in the amount of Al included in the homogenized binder may decrease the amount of catalytic Co remaining in the cutting table 212 (but may also increase the melting temperature and/or melting temperature range of the homogenized binder).

As previously mentioned, the HTHP processing heats the diamond powder 202 and the supporting substrate 204 to at least one temperature greater than the solidus temperature (e.g., to at least the liquidus temperature) of the homogenized binder of the supporting substrate 204. The temperature(s) (e.g., sintering temperature(s)) employed during the HTHP processing to form the cutting table 212 at least partially depend on the pressure(s) employed during the HTHP processing, and on the material composition of the homogenized binder of the supporting substrate 204. As described in further detail below, employing pressure(s) above atmospheric pressure (1 atm) during the HTHP processing may affect (e.g., shift) metastability lines (e.g., phase boundaries) of the liquid (L)+diamond (D)+metal carbide (MC) phase field, which may influence (e.g., compel the increase of) the temperature(s) employed to form the cutting table 212. In addition, as also described in further detail below, the material composition of the homogenized binder of the supporting substrate 204 may affect (e.g., increase, decrease) the melting temperature(s) of the homogenized binder, and may also affect (e.g., shift) the metastability lines of the L+D+MC+E2$_1$-type phase carbide (κ-carbide) phase field, which may also impact (e.g., compel the increase of) the temperature(s) employed to form the cutting table 212.

Figure 20:
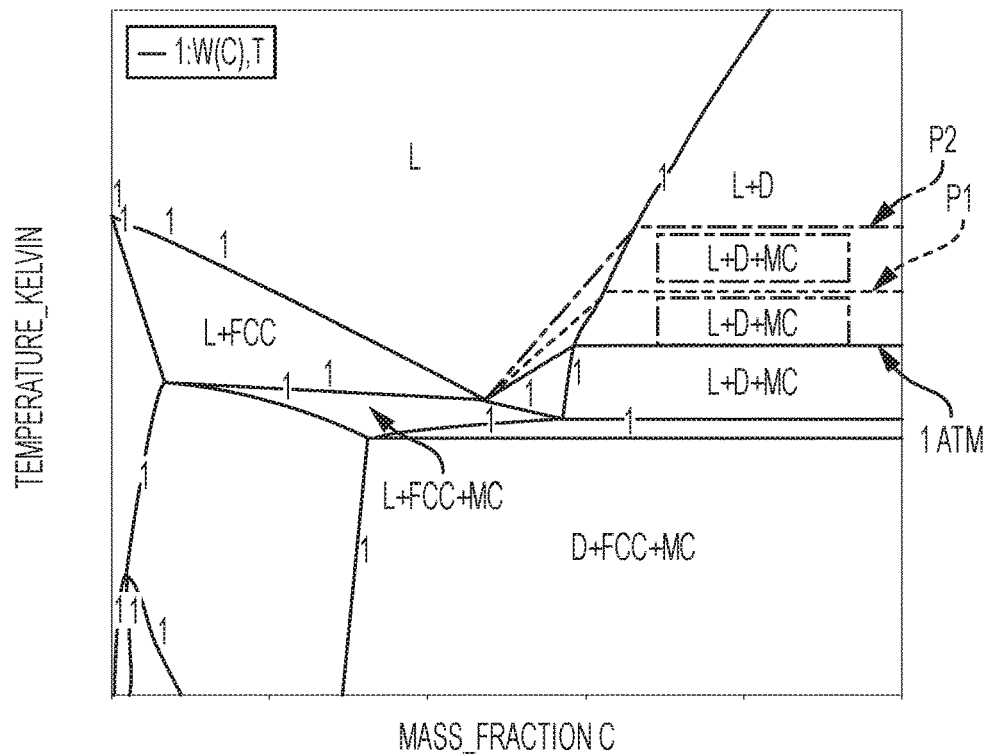
FIG. 20 is a phase diagram illustrating the effects of pressure during the formation of a cutting element of the disclosure.

FIG. 20 is a phase diagram illustrating how different pressures employed during the HTHP processing may at least affect the range (e.g., boundaries) of the L+D+MC phase field during the formation of the cutting table 212 (FIG. 2B), and hence, the temperature(s) employed during the HTHP processing to form the cutting table 212. The homogenized binder (e.g., homogenized Co—Al—W—C alloy binder) of the supporting substrate 204 (FIG. 2B) generally melts at atmospheric pressure during HTHP processing. However, after the molten homogenized binder diffuses into and fills the pore space of the diamond powder 202 (FIG. 2A), a hydrostatic condition is met (e.g., negligible deviotoric component) and the molten homogenized binder adjacent diamond particles of diamond powder 202 (FIG. 2A) exhibits pressure sensitivity. As shown in FIG. 20, elevating the pressure employed during HTHP processing from about 1 atmosphere (atm) (about 0.056 kilobar (kbar)) to another pressure P1, such as a pressure greater than or equal to about 55 kbar, raises the upper temperature boundary (e.g., upper metastability line) of the L+D+MC phase field. To maximize diamond density in the cutting table 212 (FIG. 2B), the temperature(s) employed during the HTHP processing should be at or substantially proximate the upper temperature boundary of L+D+MC phase field (i.e., the lower temperature boundary of the L+D phase field). Accordingly, employing the relatively higher pressure P1 during the HTHP processing may increase the temperature required to facilitate maximized diamond density in the cutting table 212. As also shown in FIG. 20, elevating the pressure employed during HTHP processing from the pressure P1 to yet another pressure P2, may further raise the upper temperature boundary of the L+D+MC phase field. Accordingly, the pressure(s) employed during the HTHP processing may be used to selectively control the material composition (e.g., carbide content, diamond content, etc.) of the cutting table 212 (FIG. 2B) and the HTHP processing temperature(s) used to form the cutting table 212 (FIG. 2B).

Figure 21:
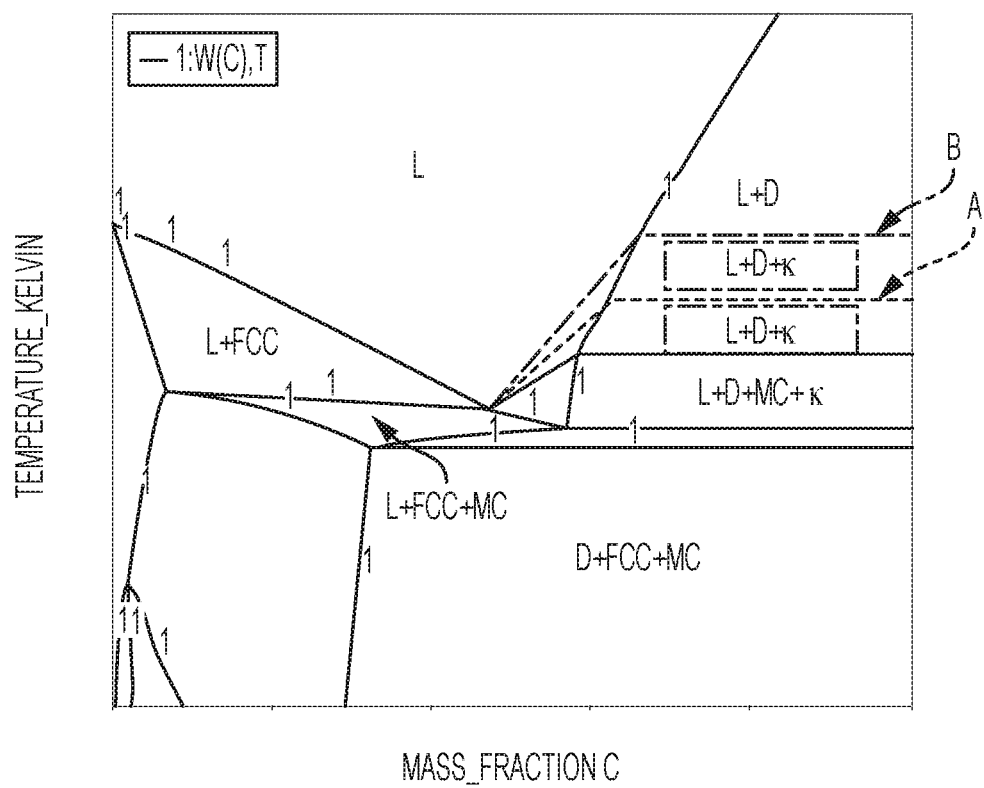
FIG. 21 is a phase diagram illustrating the effects of homogenized binder composition during the formation of a cutting element of the disclosure.

FIG. 21 is a phase diagram illustrating how different homogenized binder compositions of the supporting substrate 204 (FIG. 2B) may at least affect the range (e.g., boundaries) of the L+D+κ-carbide phase field during the formation of the cutting table 212 (FIG. 2B), and hence, the temperature(s) employed during the HTHP processing to form the cutting table 212. As shown in FIG. 21, a homogenized binder composition B including a relatively higher ratio of Al to Co may facilitate a higher upper temperature boundary (e.g., upper metastability line) of the L+D+κ-carbide phase field than another homogenized binder composition A including a relatively lower ratio of Al to Co. Put another way, employing a supporting substrate 204 including the homogenized binder composition B may increase the temperature required to exit the L+D+κ-carbide phase and enter the L+D phase field desirable for increased (e.g., maximized) diamond density in the cutting table 212 relative to a supporting substrate 204 including the homogenized binder composition A. Accordingly, the material composition of the homogenized binder of the supporting substrate 204 may also be used to selectively control the material composition (e.g., carbide content, diamond content, etc.) of the cutting table 212 (FIG. 2B) and the HTHP processing temperature(s) used to form the cutting table 212 (FIG. 2B).

With returned reference to FIG. 2B, the homogenized binder diffused into the diamond powder 202 (FIG. 2B) during the HTHP process is converted into a thermally stable material that does not promote (e.g., catalyze) the back-conversion of diamond to graphitic carbon. The thermally stable material may at least partially (e.g., substantially) fill interstitial spaces between the inter-bonded diamond particles of the cutting table 212, and may be formed of and include κ-carbide precipitates, such as $Co_3AlC_{1-x}$ precipitates, where 0≤x≤0.5. C may render the κ-carbide precipitates stable at ambient pressure and temperature conditions. In addition, under HTHP processing conditions that promote κ-carbide formation, W of the homogenized binder may partition to and react with catalytic Co.

In addition to κ-carbide precipitates, the thermally stable material of the cutting table 212 may include one or more intermetallic compound phase precipitates. By way of non-limiting example, the thermally stable material may include one or more of FCC $L1_2$ phase (e.g., gamma prime (γ') phase) precipitates, such as $Co_3(Al,W)$ precipitates and/or $(Co,X)_3(Al,W,Z)$ precipitates, wherein X comprises at least one element (e.g., Ni, Fe) that is able to occupy a site of Co in $Co_3(Al,W)$, and Z comprises at least one element that is able to occupy a site of Al or W in $Co_3(Al,W)$; FCC $DO_{22}$ phase precipitates, such as $Al_3W$ precipitates; $D8_5$ phase precipitates, such as $Co_7W_6$ precipitates; and $DO_{19}$ phase precipitates, such as $Co_3W$ precipitates. In some embodiments, the thermally stable material of the cutting table 212 is formed of and includes κ-carbide precipitates and FCC $L1_2$ phase precipitates.

The thermally stable material of the cutting table 212 may also include other precipitates formed of and including elements (e.g., Co, Al, W, C, X, Z) of the homogenized binder of the supporting substrate 204. By way of non-limiting example, the thermally stable material may include, beta (β) phase precipitates, such as CoAl; FCC $L1_0$ phase (e.g., gamma (γ) phase) precipitates; and/or other carbide precipitates, such as WC precipitates and/or $M_xC$ precipitates, where x>2 and M=Co,W.

The types and amounts of precipitates (e.g., κ-carbide precipitates, intermetallic compound phase precipitates, other precipitates) present in the thermally stable material of the cutting table 212 at least partially depends on the material composition (including component ratios) of the homogenized binder of the supporting substrate 204, and on the processing conditions (e.g., HTHP processing conditions, such as pressure(s) and temperature(s)) employed to form the cutting table 212 using the homogenized binder of the supporting substrate 204. By way of non-limiting example, under the conditions (e.g., homogenized binder compositions, pressures, temperatures) promoting the partition of W to FCC $L1_2$ phase precipitates (e.g., $Co_3(Al,W)$ precipitates), the formation of WC precipitates and/or $M_xC$ precipitates (where x>2 and M=Co,W) may be promoted, and the formation of κ-carbide precipitates may be suppressed.

The material composition of the homogenized binder present within interstitial spaces of the cutting table 212 following the formation of inter-bonded diamond particles thereof, including the types and amounts of elements included in the homogenized binder, may affect the properties of the thermally stable material formed within the interstitial spaces of the cutting table 212 as the homogenized binder ages. W partitioning of the homogenized binder may promote solid solution strengthening of the catalytic Co phase if local portioning occurs away from formed κ-carbide, may locally stabilize the FCC $L1_2$ phase precipitates of the thermally stable material in the absence of κ-carbide precipitates, and may arrest lattice dislocation between the FCC $L1_2$ phase precipitates, the κ-carbide precipitates, and the γ phase matrix (if any) of the thermally stable material. Al of the homogenized binder may facilitate FCC ordering in the form FCC $L1_2$ phase precipitates and κ-carbide precipitates, and may improve the high-temperature strength of the thermally stable material. C of the homogenized binder may facilitate the formation of the κ-carbide precipitates, may promote favorable melting characteristics of the homogenized binder, and may also increase the high-temperature strength of the thermally stable material. In addition, various other elements that may, optionally, be included in the homogenized binder may also enhance one or more properties of the thermally stable material formed therefrom.

Optionally, following formation, the cutting table 212 may be subjected to at least one solution treatment process to modify the material composition of the thermally stable material thereof. The solution treatment process may, for example, decompose κ-carbide precipitates (e.g., $Co_3AlC_{1-x}$ precipitates, where $0 \leq x \leq 0.5$) of the thermally stable material into to one or more other precipitates, such as FCC $L1_2$ phase precipitates (e.g., $Co_3(Al,W)$ precipitates and/or $(Co, X)_3(Al,W,Z)$ precipitates, wherein X comprises at least one element (e.g., Ni, Fe) that is able to occupy a site of Co in $Co_3(Al,W)$, and Z comprises at least one element that is able to occupy a site of Al or W in $Co_3(Al,W)$). By way of non-limiting example, if the homogenized binder of the supporting substrate 204 includes from about 66 wt % Co to about 90 wt % Co, from about 5 wt % Al to about 15 wt % Al, from about 0.1 wt % C to about 0.2 wt % C, and from about 5 wt % W to about 30 wt % W, and effectuates the formation of a thermally stable material including κ-carbide precipitates (e.g., $Co_3AlC_{1-x}$ precipitates, where $0 \leq x \leq 0.5$) in the cutting table 212, the cutting table 212 may optionally be subjected to a solution treatment process that heats of the thermally stable material to a temperature within a range of from about 1300° C. to about 1500° C. at a pressure above the Berman-Simon line, such as a pressure greater than or equal to about 45 kbar, to decompose the κ-carbide precipitates and form FCC $L1_2$ phase precipitates. If employed, the cutting table 212 may be subjected to a single (e.g., only one) solution treatment process at a single temperature within the range of from about 1300° C. to about 1500° C. under pressure above the Berman-Simon line, or may be subjected to a multiple (e.g., more than one) solution treatment processes at a multiple temperatures within the range of from about 1300° C. to about 1500° C. under pressure above the Berman-Simon line. Multiple solution treatment process at different temperatures may, for example, facilitate the formation of precipitates (e.g., FCC $L1_2$ phase precipitates) having different grain sizes than one another. Relatively larger precipitate sizes may enhance high-temperature properties (e.g., creep rupture properties) of the thermally stable material, and relatively smaller precipitate sizes may enhance room-temperature properties of the thermally stable material.

The thermally stable material may at least partially (e.g., substantially) coat (e.g., cover) surfaces of the inter-bonded diamond particles of the cutting table 212. The thermally stable material may be formed directly on the surfaces of the inter-bonded diamond particles of the cutting table 212, and may at least partially impede (e.g., substantially prevent) back-conversion of the inter-bonded diamond particles to other forms or phases of carbon (e.g., graphitic carbon, amorphous carbon, etc.). In some embodiments, substantially all of the catalytic Co adjacent the inter-bonded diamond particles of the cutting table 212 is partitioned (e.g., incorporated) into κ-carbide precipitates (e.g., $Co_3AlC_{1-x}$ precipitates, where $0 \leq x \leq 0.5$) and/or other precipitates (e.g., FCC $L1_2$ phase precipitates; FCC $DO_{22}$ phase precipitates; $D8_5$ phase precipitates; $DO_{19}$ phase precipitates; β phase precipitates; FCC $L1_0$ phase precipitates; WC precipitates; $M_xC$ precipitates, where $x>2$ and M=Co,W). Accordingly, the Co of the thermally stable material may not catalyze reactions that decompose the inter-bonded diamond particles during normal use and operation of the cutting table 212. In additional embodiments, some amount of unreacted Co may be present within the thermally stable material. However, the grain sizes and distributions of the κ-carbide precipitates and/or other precipitates may be controlled to limit the exposure of the inter-bonded diamond particles of the cutting table 212 to such catalytic Co.

The cutting table 212 may exhibit enhanced abrasion resistance and thermal stability up to a melting temperature or theoretical diamond stability temperature, at or near atmospheric conditions, whichever is lower, of the thermally stable material. For example, if the melting temperature of the thermally stable material is about 1,200° C., the cutting table 212 may be thermally and physically stable at temperatures within a range from about 1,000° C. to about 1,100° C., which corresponds to the theoretical limit of diamond stability under or near atmospheric conditions (assuming no oxidation occurs). The thermally stable material within interstitial spaces between the inter-bonded diamond particles of the cutting table 212 may be thermodynamically stable at ambient pressure and temperatures, as well as at temperatures and pressures experienced, for example, during downhole drilling. The thermally stable material may render the cutting table 212 thermally stable without having to remove (e.g., leach) material from the interstitial spaces of the cutting table 212.

Figure 3:
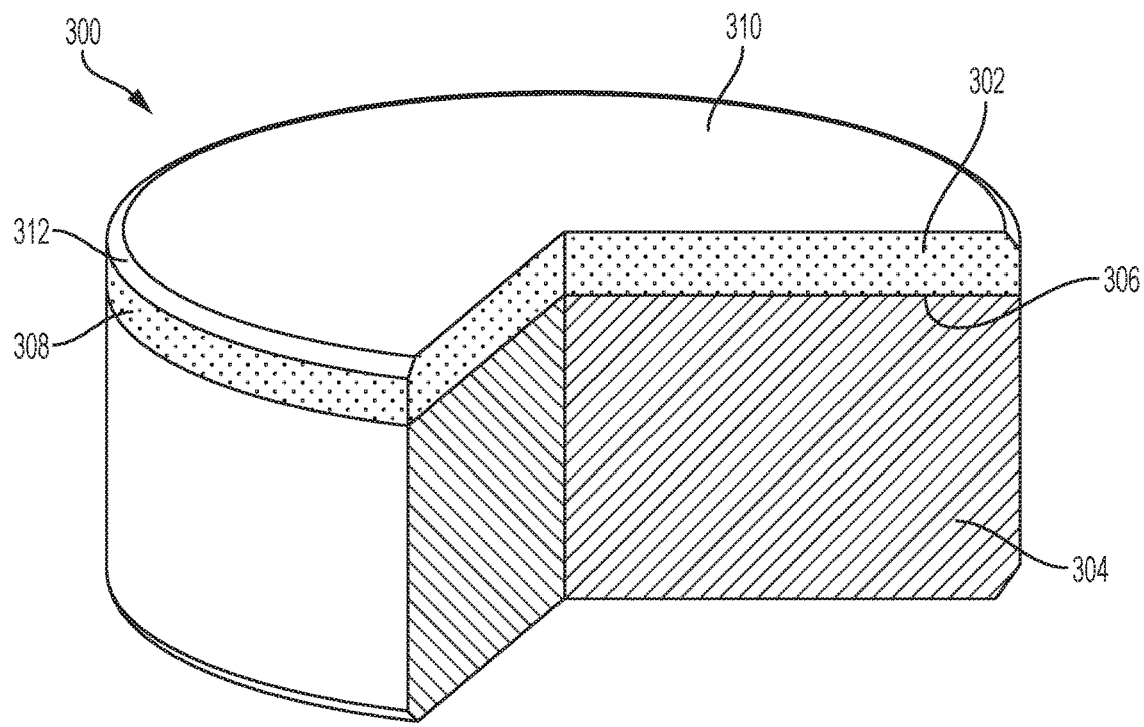
FIG. 3 is a partial cut-away perspective view of a cutting element, in accordance with embodiments of the disclosure.

FIG. 3 illustrates a cutting element 300 in accordance with embodiments of the disclosure. The cutting element 300 includes a supporting substrate 304, and a cutting table 302 bonded to the supporting substrate 304 at an interface 306. The supporting substrate 304 may have substantially the same material composition as the supporting substrate 204 previously described with reference to FIGS. 2A and 2B, and may be formed in accordance with the methods previously described with reference to FIG. 1. The cutting table 302 may be disposed directly on the supporting substrate 304, and may exhibit at least one lateral side surface 308 (also referred to as the "barrel" of the cutting table 302), a cutting face 310 (also referred to as the "top" of the cutting table 302) opposite the interface 306 between the supporting substrate 304 and the cutting table 302, and at least one cutting edge 312 at a periphery of the cutting face 310. The material composition and the material distribution of the cutting table 302 may be substantially similar to the material composition and the material distribution of the cutting table 212 previously described with respect to FIG. 2B.

The cutting table 302 and the supporting substrate 304 may each individually exhibit a generally cylindrical column shape, and the interface 306 between the supporting substrate 304 and cutting table 302 may be substantially planar. A ratio of a height of the cutting element 300 to an outer diameter of the cutting element 300 may be within a range of from about 0.1 to about 50, and a height (e.g., thickness)

of the cutting table 302 may be within a range of from about 0.3 millimeters (mm) to about 5 mm. Surfaces (e.g., the lateral side surface 308, the cutting face 310) of the cutting table 302 adjacent the cutting edge 312 may each be substantially planar, or one or more of the surfaces of the cutting table 302 adjacent the cutting edge 312 may be at least partially non-planar. Each of the surfaces of the cutting table 302 may be polished, or one or more of the surfaces of the cutting table 302 may be at least partially non-polished (e.g., lapped, but not polished). In addition, the cutting edge 312 of the cutting table 302 may be at least partially (e.g., substantially) chamfered (e.g., beveled), may be at least partially (e.g., substantially) radiused (e.g., arcuate), may be partially chamfered and partially radiused, or may be non-chamfered and non-radiused. As shown in FIG. 3, in some embodiments, the cutting edge 312 is chamfered. If the cutting edge 312 is at least partially chamfered, the cutting edge 312 may include a single (e.g., only one) chamfer, or may include multiple (e.g., more than one) chamfers (e.g., greater than or equal to two (2) chamfers, such as from two (2) chamfers to 1000 chamfers). If present, each of the chamfers may individually exhibit a width less than or equal to about 0.1 inch, such as within a range of from about 0.001 inch to about 0.1 inch.

While FIG. 3 depicts a particular configuration of the cutting element 300, including particular configurations of the cutting table 302 and the supporting substrate 304 thereof, different configurations may be employed. One or more of the cutting table 302 and the supporting substrate 304 may, for example, exhibit a different shape (e.g., a dome shape, a conical shape, a frusto conical shape, a rectangular column shape, a pyramidal shape, a frusto pyramidal shape, a fin shape, a pillar shape, a stud shape, or an irregular shape) and/or a different size (e.g., a different diameter, a different height), and/or the interface 306 between the supporting substrate 304 and cutting table 302 may be non-planar (e.g., convex, concave, ridged, sinusoidal, angled, jagged, v-shaped, u-shaped, irregularly shaped, etc.). By way of non-limiting example, in accordance with additional embodiments of the disclosure, FIGS. 4 through 15 show simplified side elevation views of cutting elements exhibiting different configurations than that of the cutting element 300 shown in FIG. 3. Throughout FIGS. 4 through 15 and the description associated therewith, functionally similar features are referred to with similar reference numerals incremented by 100. To avoid repetition, not all features shown in FIGS. 4 through 15 are described in detail herein. Rather, unless described otherwise below, a feature designated by a reference numeral that is a 100 increment of the reference numeral of a feature previously-described with respect to one or more of FIGS. 3 through 15 (whether the previously-described feature is first described before the present paragraph, or is first described after the present paragraph) will be understood to be substantially similar to the previously-described feature.

Figure 4:
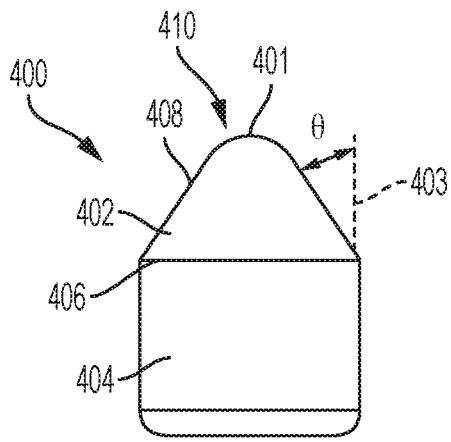
FIGS. 4 through 15 are side elevation views of different cutting elements, in accordance with additional embodiments of the disclosure.

FIG. 4 illustrates a simplified side elevation view of a cutting element 400, in accordance with another embodiment of the disclosure. The cutting element 400 includes a supporting substrate 404, and a cutting table 402 attached to the supporting substrate 404 at an interface 406. The supporting substrate 404 and the cutting table 402 may respectively have a material composition and a material distribution substantially similar to the material composition and the material distribution of the supporting substrate 204 and the cutting table 212 previously described with reference to FIGS. 2A and 2B. As shown in FIG. 4, the cutting table 402 exhibits a generally conical shape, and includes a conical side surface 408 and an apex 401 (e.g., tip) that at least partially define a cutting face 410 of the cutting table 402. The apex 401 comprises an end of the cutting table 404 opposing another end of the cutting table 402 secured to the supporting substrate 404 at the interface 406. The conical side surface 408 extends upwardly and inwardly from or proximate the interface 406 toward the apex 401. The apex 401 may be centered about a central longitudinal axis of the cutting element 400, and may be at least partially (e.g., substantially) radiused (e.g., arcuate). The conical side surface 408 may be defined by at least one angle θ between the conical side surface 408 and a phantom line 403 (shown in FIG. 4 with dashed lines) longitudinally extending from a lateral side surface of the supporting substrate 404. The angle θ may, for example, be within a range of from about five degrees (5°) to about eighty-five degrees (85°), such as from about fifteen degrees (15°) to about seventy-five degrees (75°), from about thirty degrees (30°) to about sixty degrees (60°), or from about forty-five degrees 45°) to about sixty degrees (60°). Ratios of a height of the cutting element 400 to outer diameters of the cutting element 400 may be within a range of from about 0.1 to about 48. The cutting element 400, including the cutting table 402 and the supporting substrate 404 thereof, may be formed using a process substantially similar to that previously described with reference to FIGS. 2A and 2B.

Figure 5:
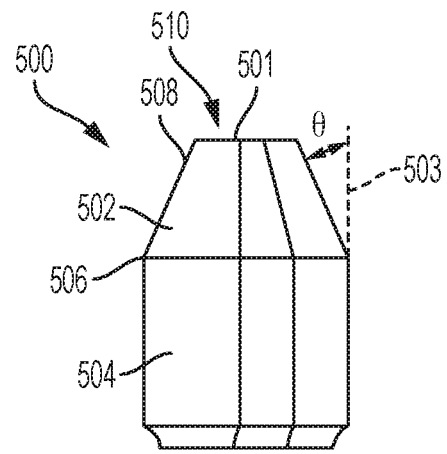

FIG. 5 illustrates a simplified side elevation view of a cutting element 500, in accordance with another embodiment of the disclosure. The cutting element 500 includes a supporting substrate 504, and a cutting table 502 attached to the supporting substrate 504 at an interface 506. The supporting substrate 504 and the cutting table 502 may respectively have a material composition and a material distribution substantially similar to the material composition and the material distribution of the supporting substrate 204 and the cutting table 212 previously described with reference to FIGS. 2A and 2B. As shown in FIG. 5, the cutting table 502 exhibits a generally frusto-conical shape, and includes a conical side surface 508 and an apex 501 (e.g., tip) that at least partially define a cutting face 510 of the cutting table 502. The apex 501 comprises an end of the cutting table 504 opposing another end of the cutting table 502 secured to the supporting substrate 504 at the interface 506. The conical side surface 508 extends upwardly and inwardly from or proximate the interface 506 toward the apex 501. The apex 501 may be centered about and may extend symmetrically outward diametrically from and perpendicular to a central longitudinal axis of the cutting element 500. The apex 501 may exhibit a circular lateral shape or a non-circular lateral shape (e.g., a laterally elongated shape, such as a rectangular shape, a non-rectangular quadrilateral shape, an elliptical shape, etc.), and may be substantially flat (e.g., two-dimensional, planar, non-radiused, non-arcuate, non-curved). The conical side surface 508 may be defined by at least one angle θ between the conical side surface 508 and a phantom line 503 (shown in FIG. 5 with dashed lines) longitudinally extending from a lateral side surface of the supporting substrate 504. The angle θ may, for example, be within a range of from about 5° to about 85°, such as from about 15° to about 75°, from about 30° to about 60°, or from about 45° to about 60°. Interfaces (e.g., edges) between the conical side surface 508 and the apex 501 may be smooth and transitioned (e.g., chamfered and/or radiused), or may be sharp (e.g., non-chamfered and non-radiused). A ratio of an outer diameter of the cutting table 502 at the apex 501 relative to an outer diameter of the cutting table 502 at the interface 506 may be within a range of from about 0.001 to about 1. The cutting element 500, including the cutting table 502 and the supporting substrate 504 thereof, may be formed using a process substantially similar to that previously described with reference to FIGS. 2A and 2B.

Figure 6:
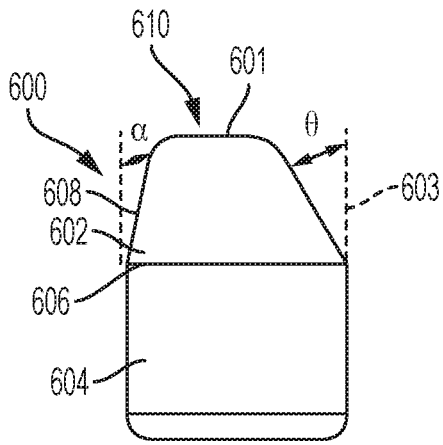

FIG. 6 illustrates a simplified side elevation view of a cutting element 600, in accordance with another embodiment of the disclosure. The cutting element 600 includes a supporting substrate 604, and a cutting table 602 attached to the supporting substrate 604 at an interface 606. The supporting substrate 604 and the cutting table 602 may respectively have a material composition and a material distribution substantially similar to the material composition and the material distribution of the supporting substrate 204 and the cutting table 212 previously described with reference to FIGS. 2A and 2B. As shown in FIG. 6, the cutting table 602 exhibits a generally frusto-conical shape, and includes a conical side surface 608 and an apex 601 (e.g., tip) that at least partially define a cutting face 610 of the cutting table 602. The apex 601 comprises an end of the cutting table 604 opposing another end of the cutting table 602 secured to the supporting substrate 604 at the interface 606. The conical side surface 608 extends upwardly and inwardly from or proximate the interface 606 toward the apex 601. A center of the apex 601 may be laterally offset from a central longitudinal axis of the cutting element 600. The apex 601 may exhibit a circular lateral shape or a non-circular lateral shape (e.g., a laterally elongated shape, such as a rectangular shape, a non-rectangular quadrilateral shape, an elliptical shape, etc.), and may be substantially flat (e.g., two-dimensional, planar, non-radiused, non-arcuate, non-curved). At least one region of the conical side surface 608 may be defined by at least one angle $\theta$ between the conical side surface 608 and a phantom line 603 (shown in FIG. 6 with dashed lines) longitudinally extending from a lateral side surface of the supporting substrate 604, and at least one other region of the conical side surface 608 may be defined by at least one additional angle $\alpha$ between the conical side surface 608 and the phantom line 603. The angle $\theta$ may be greater than the additional angle $\alpha$. Each of the angle $\theta$ and the additional angle $\alpha$ may individually be within a range of from about 5° to about 85°. Interfaces (e.g., edges) between the conical side surface 608 and the apex 601 may be smooth and transitioned (e.g., chamfered and/or radiused), or may be sharp (e.g., non-chamfered and non-radiused). A ratio of an outer diameter of the cutting table 602 at the apex 601 relative to an outer diameter of the cutting table 602 at the interface 606 may be within a range of from about 0.001 to about 1. The cutting element 600, including the cutting table 602 and the supporting substrate 604 thereof, may be formed using a process substantially similar to that previously described with reference to FIGS. 2A and 2B.

Figure 7:
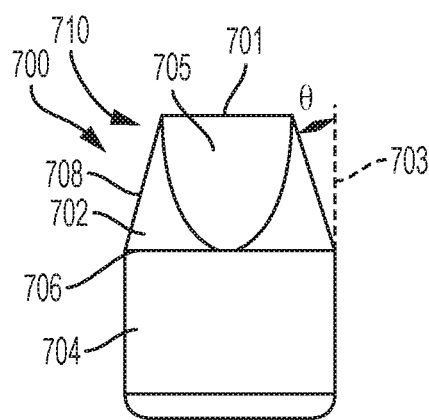

FIG. 7 illustrates a simplified side elevation view of a cutting element 700, in accordance with another embodiment of the disclosure. The cutting element 700 includes a supporting substrate 704, and a cutting table 702 attached to the supporting substrate 704 at an interface 706. The supporting substrate 704 and the cutting table 702 may respectively have a material composition and the material distribution substantially similar to a material composition and the material distribution of the supporting substrate 204 and the cutting table 212 previously described with reference to FIGS. 2A and 2B. As shown in FIG. 7, the cutting table 702 exhibits a chisel shape, and includes opposing conical side surfaces 708, opposing flat side surfaces 705, and an apex 701 (e.g., tip) that at least partially define a cutting face 710 of the cutting table 702. The apex 701 comprises an end of the cutting table 704 opposing another end of the cutting table 702 secured to the supporting substrate 704 at the interface 706. The opposing conical side surfaces 708 extend upwardly and inwardly from or proximate the interface 706 toward the apex 701. The opposing flat side surfaces 705 intervene between the opposing conical side surfaces 708, and also extend upwardly and inwardly from or proximate the interface 706 toward the apex 701. The apex 701 may be centered about and may extend symmetrically outward diametrically from and perpendicular to a central longitudinal axis of the cutting element 700. The apex 701 may exhibit a circular lateral shape or a non-circular lateral shape (e.g., a laterally elongated shape, such as a rectangular shape, a non-rectangular quadrilateral shape, an elliptical shape, etc.), and may be either arcuate (e.g., non-planar, radiused, curved) or substantially flat (e.g., two-dimensional, planar, non-radiused, non-arcuate, non-curved). The opposing conical side surfaces 708 may be defined by at least one angle $\theta$ between each of the opposing conical side surfaces 708 and a phantom line 703 (shown in FIG. 7 with dashed lines) longitudinally extending from a lateral side surface of the supporting substrate 704. The angle $\theta$ may, for example, be within a range of from about 5° to about 85°, such as from about 15° to about 75°, from about 30° to about 60°, or from about 45° to about 60°. The opposing flat side surfaces 705 may individually be defined by at least one other angle between the flat surface 705 and the phantom line 703, wherein the at least one other angle is different than (e.g., less than or greater than) the angle $\theta$ between each of the opposing conical side surfaces 708 and the phantom line 703. Interfaces between the opposing conical side surfaces 708, the opposing flat side surfaces 705, and the apex 701 may be smooth and transitioned (e.g., chamfered and/or radiused), or may be sharp (e.g., non-chamfered and non-radiused). In some embodiments, a maximum height of the cutting element 700 is less than or equal to about 48 mm. The cutting element 700, including the cutting table 702 and the supporting substrate 704 thereof, may be formed using a process substantially similar to that previously described with reference to FIGS. 2A and 2B.

Figure 8:
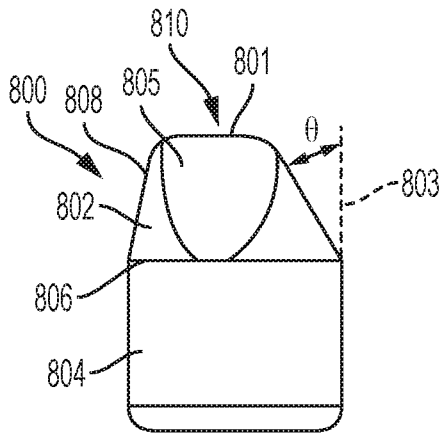

FIG. 8 illustrates a simplified side elevation view of a cutting element 800, in accordance with another embodiment of the disclosure. The cutting element 800 includes a supporting substrate 804, and a cutting table 802 attached to the supporting substrate 804 at an interface 806. The supporting substrate 804 and the cutting table 802 may respectively have a material composition and a material distribution substantially similar to the material composition and the material distribution of the supporting substrate 204 and the cutting table 212 previously described with reference to FIGS. 2A and 2B. As shown in FIG. 8, the cutting table 802 exhibits a chisel shape, and includes opposing conical side surfaces 808, opposing flat side surfaces 805, and an apex 801 (e.g., tip) that at least partially define a cutting face 810 of the cutting table 802. The apex 801 comprises an end of the cutting table 804 opposing another end of the cutting table 802 secured to the supporting substrate 804 at the interface 806. The opposing conical side surfaces 808 extend upwardly and inwardly from or proximate the interface 806 toward the apex 801. The opposing flat side surfaces 805 intervene between the opposing conical side surfaces 808, and also extend upwardly and inwardly from or proximate the interface 806 toward the apex 801. A center of the apex 801 may be laterally offset from a central longitudinal axis of the cutting element 800. The apex 801 may exhibit a circular lateral shape or a non-circular lateral shape (e.g., a laterally elongated shape, such as a rectangular shape, a non-rectangular quadrilateral shape, an elliptical shape, etc.), and may be either arcuate (e.g., non-planar, radiused, curved) or substantially flat (e.g., two-dimensional, planar, non-radiused, non-arcuate, non-curved). One of the opposing conical side surfaces 808 may be defined by at least one angle θ between the conical side surface 808 and a phantom line 803 (shown in FIG. 8 with dashed lines) longitudinally extending from a lateral side surface of the supporting substrate 804, and another of the opposing conical side surfaces 808 may be defined by another angle less than the angle θ. The angle θ may be within a range of from about 5° to about 85°, such as from about 15° to about 75°, from about 30° to about 60°, or from about 45° to about 60°. The opposing flat side surfaces 805 may individually be defined by at least one additional angle between the flat side surface 805 and the phantom line 803, wherein the at least one additional angle is different than (e.g., less than or greater than) the angle θ. Interfaces between the opposing conical side surfaces 808, the opposing flat side surfaces 805, and the apex 801 may be smooth and transitioned (e.g., chamfered and/or radiused), or may be sharp (e.g., non-chamfered and non-radiused). The cutting element 800, including the cutting table 802 and the supporting substrate 804 thereof, may be formed using a process substantially similar to that previously described with reference to FIGS. 2A and 2B.

Figure 9:
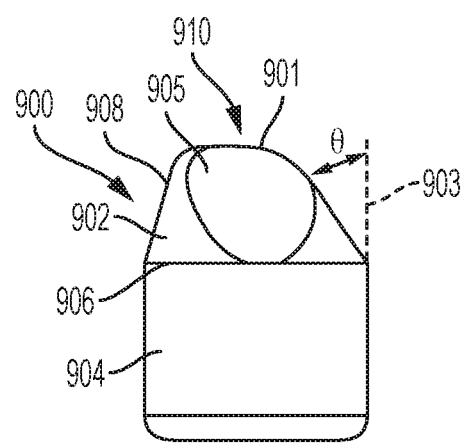

FIG. 9 illustrates a simplified side elevation view of a cutting element 900, in accordance with another embodiment of the disclosure. The cutting element 900 includes a supporting substrate 904, and a cutting table 902 attached to the supporting substrate 904 at an interface 906. The supporting substrate 904 and the cutting table 902 may respectively have a material composition and a material distribution substantially similar to the material composition and the material distribution of the supporting substrate 204 and the cutting table 212 previously described with reference to FIGS. 2A and 2B. As shown in FIG. 9, the cutting table 902 exhibits a chisel shape, and includes opposing conical side surfaces 908, opposing flat side surfaces 905, and an apex 901 (e.g., tip) that at least partially define a cutting face 910 of the cutting table 902. The configuration of the cutting table 902 is similar to the configuration of the cutting table 802 (FIG. 8) except that the apex 901 of the cutting table 902 may extend non-perpendicular (e.g., non-orthogonal) to a central longitudinal axis of the cutting element 900. For example, the apex 901 of the cutting table 902 may exhibit a negative slope or a positive slope. The cutting element 900, including the cutting table 902 and the supporting substrate 904 thereof, may be formed using a process substantially similar to that previously described with reference to FIGS. 2A and 2B.

Figure 10:
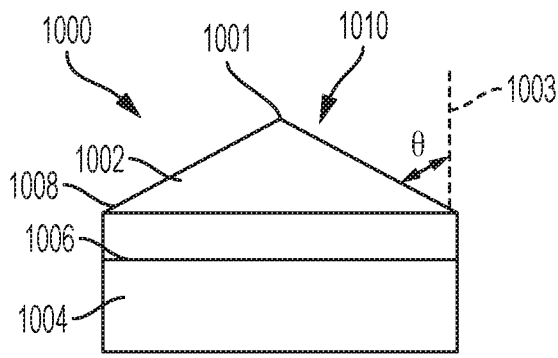

FIG. 10 illustrates a simplified side elevation view of a cutting element 1000, in accordance with another embodiment of the disclosure. The cutting element 1000 includes a supporting substrate 1004, and a cutting table 1002 attached to the supporting substrate 1004 at an interface 1006. The supporting substrate 1004 and the cutting table 1002 may respectively have a material composition and a material distribution substantially similar to the material composition and the material distribution of the supporting substrate 204 and the cutting table 212 previously described with reference to FIGS. 2A and 2B. As shown in FIG. 10, the cutting table 1002 exhibits a generally conical shape, and includes a semi-conical side surface 1008 and an apex 1001 (e.g., tip) that at least partially define a cutting face 1010 of the cutting table 1002. The apex 1001 comprises an end of the cutting table 1004 opposing another end of the cutting table 1002 secured to the supporting substrate 1004 at the interface 1006. The apex 1001 may be sharp (e.g., non-radiused), and may be centered about a central longitudinal axis of the cutting element 1000. For example, the apex 1001 may be a single (e.g., only one) point most distal from the interface 1006 between the supporting substrate 1004 and a cutting table 1002, or may be a single line most distal from the interface 1006 between the supporting substrate 1004 and a cutting table 1002. The semi-conical side surface 1008 may include a first portion adjacent the supporting substrate 1004 and extending substantially parallel to a phantom line 1003 (shown in FIG. 10 with dashed lines) longitudinally extending from a lateral side surface of the supporting substrate 1004, and a second portion between the first portion and the apex 1001 and extending at an angle θ relative to the phantom line 1003. The angle θ may, for example, be within a range of from about 5° to about 85°, such as from about 15° to about 75°, from about 30° to about 60°, or from about 45° to about 60°. The cutting element 1000, including the cutting table 1002 and the supporting substrate 1004 thereof, may be formed using a process substantially similar to that previously described with reference to FIGS. 2A and 2B.

Figure 11:
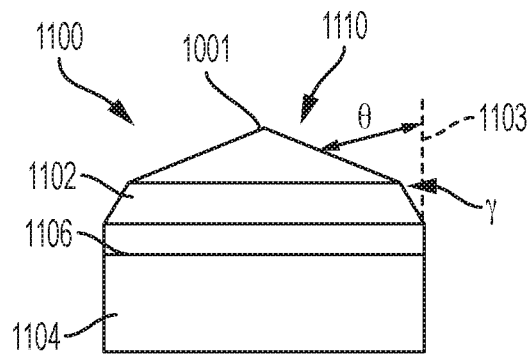

FIG. 11 illustrates a simplified side elevation view of a cutting element 1100, in accordance with another embodiment of the disclosure. The cutting element 1100 includes a supporting substrate 1104, and a cutting table 1102 attached to the supporting substrate 1104 at an interface 1106. The supporting substrate 1104 and the cutting table 1102 may respectively have a material composition and a material distribution substantially similar to the material composition and the material distribution of the supporting substrate 204 and the cutting table 212 previously described with reference to FIGS. 2A and 2B. As shown in FIG. 11, the cutting table 1102 exhibits a non-cylindrical shape, and includes a semi-conical side surface 1108 and an apex 1101 (e.g., tip) that at least partially define a cutting face 1110 of the cutting table 1102. The apex 1101 comprises an end of the cutting table 1104 opposing another end of the cutting table 1102 secured to the supporting substrate 1104 at the interface 1106. The apex 1101 may be sharp (e.g., non-radiused), and may be centered about a central longitudinal axis of the cutting element 1100. For example, the apex 1101 may be a single (e.g., only one) point most distal from the interface 1106 between the supporting substrate 1104 and a cutting table 1102, or may be a single line most distal from the interface 1106 between the supporting substrate 1104 and a cutting table 1102. The semi-conical side surface 1108 may include a first portion adjacent the supporting substrate 1104 and extending substantially parallel to a phantom line 1103 (shown in FIG. 11 with dashed lines) longitudinally extending from a lateral side surface of the supporting substrate 1104, a second portion adjacent the first portion and extending at an angle γ relative to the phantom line 1103, and a third portion between the second portion and the apex 1101 and extending at an angle θ relative to the phantom line 1103. The angle θ between the third portion of the semi-conical side surface 1108 and the phantom line 1103 may be greater than the angle γ between the second portion of the semi-conical side surface 1108 and the phantom line 1103. Each of the angle γ between the second portion of the semi-conical side surface 1108 and the phantom line 1103 and angle θ between the third portion of the semi-conical side surface 1108 and the phantom line 1103 may individually be within a range of from about 5° to about 85°. The cutting element 1100, including the cutting table 1102 and the supporting substrate 1104 thereof, may be formed using a process substantially similar to that previously described with reference to FIGS. 2A and 2B.

Figure 12:
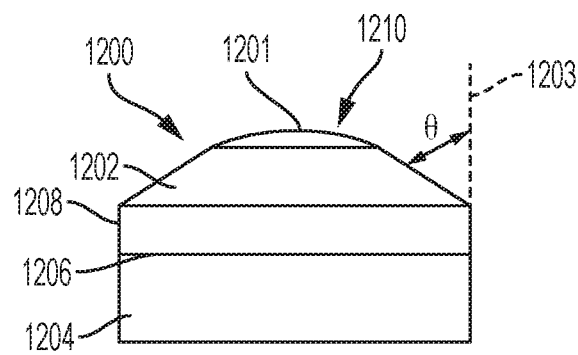

FIG. 12 illustrates a simplified side elevation view of a cutting element 1200, in accordance with another embodiment of the disclosure. The cutting element 1200 includes a supporting substrate 1204, and a cutting table 1202 attached to the supporting substrate 1204 at an interface 1206. The supporting substrate 1204 and the cutting table 1202 may respectively have a material composition and a material distribution substantially similar to the material composition and the material distribution of the supporting substrate 204 and the cutting table 212 previously described with reference to FIGS. 2A and 2B. As shown in FIG. 12, the cutting table 1202 exhibits a non-cylindrical shape, and includes a semi-conical side surface 1208 and an apex 1201 (e.g., tip) that at least partially define a cutting face 1210 of the cutting table 1202. The apex 1201 comprises an end of the cutting table 1204 opposing another end of the cutting table 1202 secured to the supporting substrate 1204 at the interface 1206. The apex 1201 may be radiused (e.g., arcuate, curved), and may be centered about a central longitudinal axis of the cutting element 1200. The semi-conical side surface 1208 may include a first portion adjacent the supporting substrate 1204 and extending substantially parallel to a phantom line 1203 (shown in FIG. 12 with dashed lines) longitudinally extending from a lateral side surface of the supporting substrate 1204, and a second portion between the first portion and the apex 1201 and extending at an angle θ relative to the phantom line 1203. The angle θ may, for example, be within a range of from about 5° to about 85°, such as from about 15° to about 75°, from about 30° to about 60°, or from about 45° to about 60°. The cutting element 1200, including the cutting table 1202 and the supporting substrate 1204 thereof, may be formed using a process substantially similar to that previously described with reference to FIGS. 2A and 2B.

Figure 13:
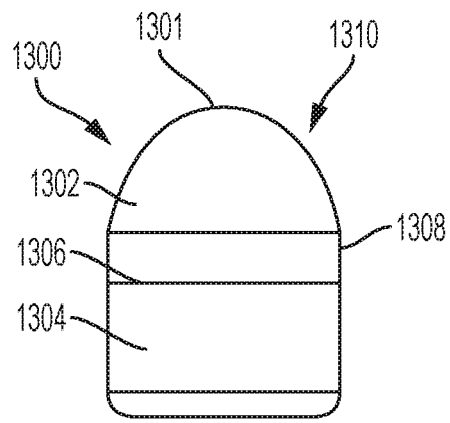

FIG. 13 illustrates a simplified side elevation view of a cutting element 1300, in accordance with another embodiment of the disclosure. The cutting element 1300 includes a supporting substrate 1304, and a cutting table 1302 attached to the supporting substrate 1304 at an interface 1306. The supporting substrate 1304 and the cutting table 1302 may respectively have a material composition and a material distribution substantially similar to the material composition and the material distribution of the supporting substrate 204 and the cutting table 212 previously described with reference to FIGS. 2A and 2B. As shown in FIG. 13, the cutting table 1202 exhibits a generally hemispherical shape, and includes a semi-hemispherical side surface 1308 and an apex 1301 (e.g., tip) that at least partially define a cutting face 1310 of the cutting table 1302. The apex 1301 comprises an end of the cutting table 1304 opposing another end of the cutting table 1302 secured to the supporting substrate 1304 at the interface 1306. The apex 1301 may be radiused (e.g., arcuate, curved), and may be centered about a central longitudinal axis of the cutting element 1300. The semi-hemispherical side surface 1308 may include a first portion adjacent the supporting substrate 1304 and extending substantially parallel to a lateral side surface of the supporting substrate 1304, and a second portion extending in an arcuate (e.g., curved) path between the first portion and the apex 1301. The cutting element 1300, including the cutting table 1302 and the supporting substrate 1304 thereof, may be formed using a process substantially similar to that previously described with reference to FIGS. 2A and 2B.

Figure 14:
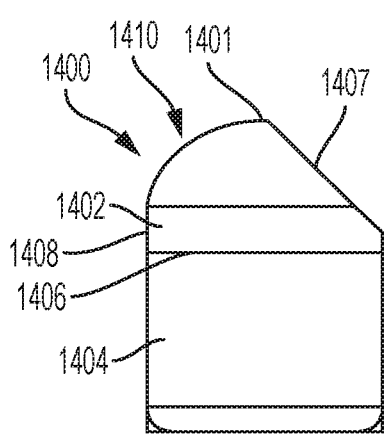

FIG. 14 illustrates a simplified side elevation view of a cutting element 1400, in accordance with another embodiment of the disclosure. The cutting element 1400 includes a supporting substrate 1404, and a cutting table 1402 attached to the supporting substrate 1404 at an interface 1406. The supporting substrate 1404 and the cutting table 1402 may respectively have a material composition and a material distribution substantially similar to the material composition and the material distribution of the supporting substrate 204 and the cutting table 212 previously described with reference to FIGS. 2A and 2B. As shown in FIG. 14, the cutting table 1402 exhibits a semi-hemispherical shape, and includes a semi-hemispherical side surface 1408, a flat side surface\ 1407, and an apex 1401 (e.g., tip) that at least partially define a cutting face 1410 of the cutting table 1402. The apex 1401 comprises an end of the cutting table 1404 opposing another end of the cutting table 1402 secured to the supporting substrate 1404 at the interface 1406. The semi-hemispherical side surface 1408 extends upwardly and inwardly from or proximate the interface 1406 toward the apex 1401. The flat side surface 1407 opposes the semi-hemispherical side surface 1408, and also extends upwardly and inwardly from or proximate the interface 1406 toward the apex 1401. The apex 1401 may be centered a longitudinal axis of the cutting element 1400. The semi-hemispherical side surface 1408 may include a first portion adjacent the supporting substrate 1404 and extending substantially parallel to a lateral side surface of the supporting substrate 1404, and a second portion extending in an arcuate (e.g., curved) path between the first portion and the apex 1401. The flat side surface 1407 may be substantially planar, and may be angled relative to a lateral side surface of the supporting substrate 1404. Interfaces between the semi-hemispherical side surface 1408, the flat side surface 1407, and the apex 1401 may be smooth and transitioned (e.g., chamfered and/or radiused), or may be sharp (e.g., non-chamfered and non-radiused). The cutting element 1400, including the cutting table 1402 and the supporting substrate 1404 thereof, may be formed using a process substantially similar to that previously described with reference to FIGS. 2A and 2B.

Figure 15:
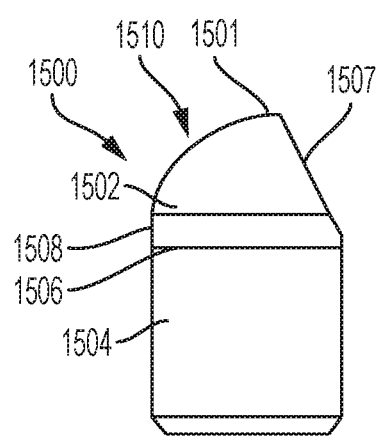

FIG. 15 illustrates a simplified side elevation view of a cutting element 1500, in accordance with another embodiment of the disclosure. The cutting element 1500 includes a supporting substrate 1504, and a cutting table 1502 attached to the supporting substrate 1504 at an interface 1506. The supporting substrate 1504 and the cutting table 1502 may respectively have a material composition and a material distribution substantially similar to the material composition and the material distribution of the supporting substrate 204 and the cutting table 212 previously described with reference to FIGS. 2A and 2B. As shown in FIG. 15, the cutting table 1502 exhibits a semi-hemispherical shape, and includes a semi-hemispherical side surface 1508, a flat side surface 1507, and an apex 1501 (e.g., tip) that at least partially define a cutting face 1510 of the cutting table 1502. The configuration of the cutting table 1502 is similar to the configuration of the cutting table 1402 (FIG. 14) except that the apex 1501 of the cutting table 1502 is laterally offset from a central longitudinal axis of the cutting element 1500. Laterally offsetting the apex 1501 from the central longitudinal axis of the cutting element 1500 may extend the dimensions of the semi-hemispherical side surface 1508 relative to those of the semi-hemispherical side surface 1408 (FIG. 14) of the cutting element 1400 (FIG. 14), and may reduce the dimensions and angle of the flat side surface 1507 relative to those of the flat side surface 1407 (FIG. 14) of the cutting element 1400 (FIG. 14). The cutting element 1500, including the cutting table 1502 and the supporting substrate 1504 thereof, may be formed using a process substantially similar to that previously described with reference to FIGS. 2A and 2B.

The methods of the disclosure may also be employed to form structures other than cutting elements. Namely, the methods of the disclosure may be used whenever it is desired to form a structure or device including a table of hard material, such as diamond table (e.g., PDC table). The methods of disclosure may, for example, be employed to form various other structures associated with (e.g., employed in) downhole operations, such as bearing structures (e.g., bearing pads, bearing discs, bearing blocks, bearing sleeves), wear structures (e.g., wear pads, wear discs, wear block), block structures, die structures (e.g., tool die structures, wire die structures), and/or other structures. By way of non-limiting example, FIGS. 16 and 17 show additional structures (e.g., a bearing structure, a die structure) that may be formed in accordance with embodiments of the disclosure.

Figure 16:
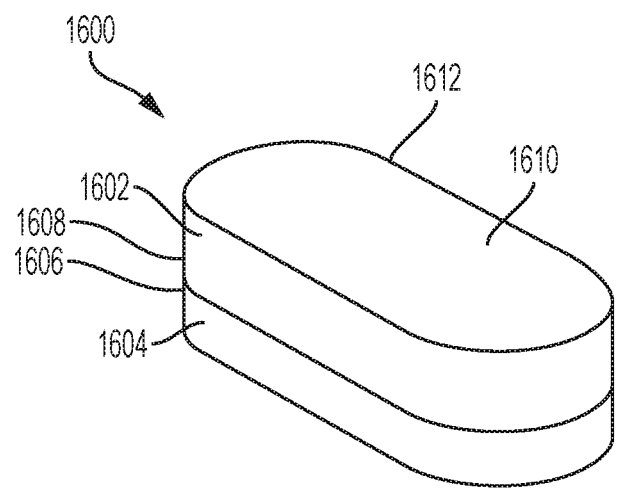
FIG. 16 is a perspective view of a bearing structure, in accordance with embodiments of the disclosure.

FIG. 16 illustrates a perspective view of a bearing structure 1600, in accordance with another embodiment of the disclosure. The bearing structure 1600 includes a supporting substrate 1604, and a hard martial table 1602 (e.g., PDC table) attached to the supporting substrate 1604 at an interface 1606. The supporting substrate 1604 and the cutting table 1602 may respectively have a material composition and a material distribution substantially similar to the material composition and the material distribution of the supporting substrate 204 and the cutting table 212 previously described with reference to FIGS. 2A and 2B. The bearing structure 1600 may exhibit any desired peripheral geometric configuration (e.g., peripheral shape and peripheral size) suitable for a predetermined use of the bearing structure 1600. By way of non-limiting example, as shown in FIG. 16, the bearing structure 1600 may exhibit an elongate three-dimensional (3D) shape, such as an ellipsoidal cylinder shape. In additional embodiments, the bearing structure 1600 may exhibit a different peripheral shape (e.g., a rectangular cylinder shape; circular cylinder shape; a conical shape; a frustoconical shape; truncated versions thereof; or an irregular shape, such as a complex shape complementary to a recess or socket in an earth-boring tool to receive and hold the bearing structure 1600). In addition, the interface 1606 between the supporting substrate 1604 and the hard martial table 1602 may be substantially planar, or may be non-planar (e.g., curved, angled, jagged, sinusoidal, v-shaped, u-shaped, irregularly shaped, combinations thereof, etc.). The bearing structure 1600, including the hard martial table 1602 and the supporting substrate 1604 thereof, may be formed using a process substantially similar to that previously described with reference to FIGS. 2A and 2B.

Figure 17:
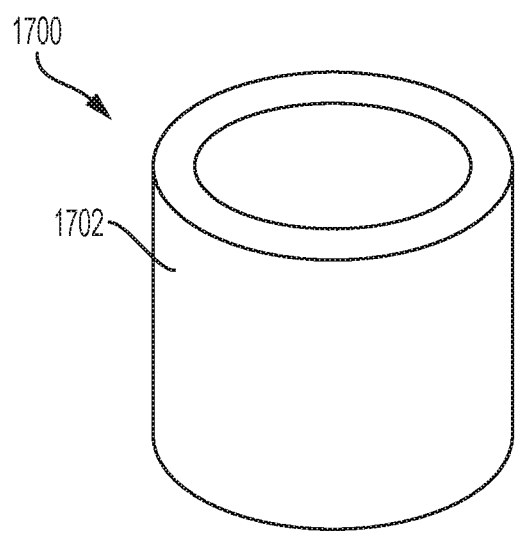
FIG. 17 is a perspective view of a die structure, in accordance with embodiments of the disclosure.

FIG. 17 illustrates a perspective view of die structure 1700, in accordance with another embodiment of the disclosure. The die structure 1700 includes a hard martial table 1702 (e.g., PDC table), wherein the hard martial table 1702 may have a material composition and a material distribution substantially similar to the material composition and the material distribution of the cutting table 212 previously described with reference to FIG. 2B. The die structure 1700 may exhibit any desired peripheral geometric configuration (e.g., peripheral shape and peripheral size) suitable for a predetermined use of the die structure 1700, such as a peripheral geometric configuration complementary to formation of another structure (e.g., an earth-boring tool structure, a wire structure) having a desired and predetermined peripheral geometric configuration. By way of non-limiting example, as shown in FIG. 17, the die structure 1700 may exhibit an at least partially (e.g., substantially) hollow elongate three-dimensional (3D) shape, such as a tubular shape. In additional embodiments, the die structure 1700 may exhibit a different peripheral shape, such as an at least partially hollow form of a conical, cubic, cuboidal, cylindrical, semi-cylindrical, spherical, semi-spherical, triangular prismatic, or irregular shape. The die structure 1700, including the hard martial table 1702 thereof, may be formed using a process substantially similar to that previously described with reference to FIGS. 2A and 2B.

Figure 18:
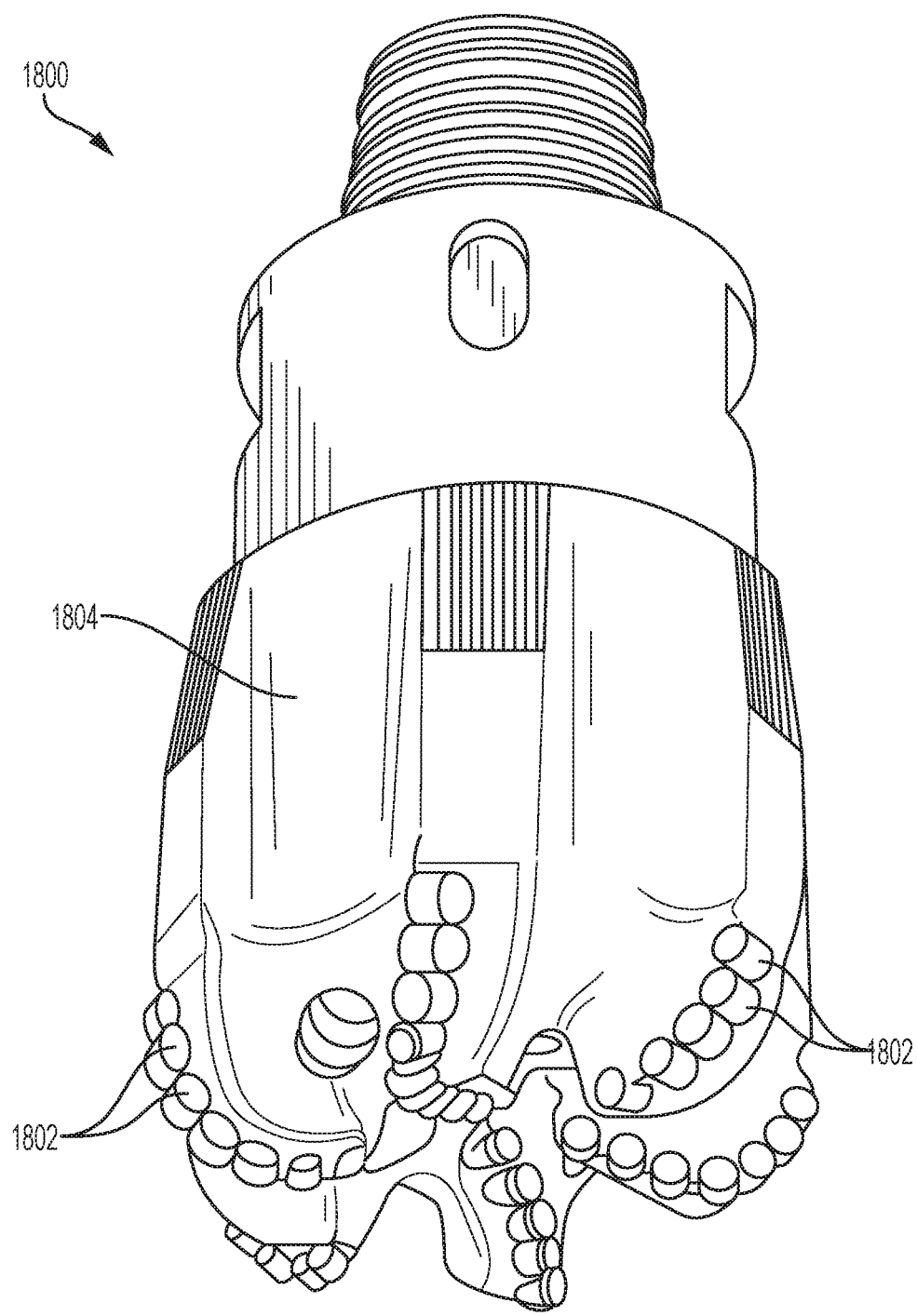
FIG. 18 is a perspective view of an embodiment of a fixed-cutter earth-boring rotary drill bit including a cutting element of the disclosure.

Embodiments of cutting elements (e.g., the cutting elements 300, 400, 500, 600, 700, 800, 900, 1000, 1100, 1200, 1300, 1400, 1500 illustrated in FIGS. 3 through 15) described herein may be secured to an earth-boring tool and used to remove subterranean formation material in accordance with additional embodiments of the disclosure. The earth-boring tool may, for example, be a rotary drill bit, a percussion bit, a coring bit, an eccentric bit, a reamer tool, a milling tool, etc. As a non-limiting example, FIG. 18 illustrates a fixed-cutter type earth-boring rotary drill bit 1800 that includes cutting elements 1802. One or more of the cutting elements 1802 may be substantially similar to one or more of the cutting elements 300, 400, 500, 600, 700, 800, 900, 1000, 1100, 1200, 1300, 1400, 1500 previously described herein with respect to FIGS. 3 through 15, and may be formed in accordance to the methods previously described herein with reference to FIGS. 2A and 2B. The rotary drill bit 1800 includes a bit body 1804, and the cutting elements 1802 are attached to the bit body 1804. The cutting elements 1802 may, for example, be brazed, welded, or otherwise secured, within pockets formed in an outer surface of the bit body 1804. Optionally, the rotary drill bit 1800 may also include one or more other structures (e.g., bearing structures, wear structures, block structures) formed according to embodiments of the disclosure, such as the bearing structure 1600 previously described herein with respect to FIG. 16.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:
1. A method of forming a cutting element, comprising:
providing a supporting substrate comprising WC particles dispersed within a homogenized binder comprising from about 66 wt % Co to about 90 wt % Co, from about 5.0 wt % Al to about 15 wt % Al, from about 0.1 wt % C to about 0.2 wt % C, and from about 5.0 wt % W to about 30 wt % W;
depositing a powder comprising diamond particles directly on the supporting substrate;
subjecting the supporting substrate and the powder to elevated temperatures and elevated pressures to diffuse a portion of the homogenized binder of the supporting substrate into the powder and inter-bond the diamond particles; and
converting the homogenized binder within interstitial spaces between the inter-bonded diamond particles into a thermally stable material substantially free of catalytic Co, without leaching, and comprising κ-carbide precipitates.

2. The method of claim 1, wherein providing a supporting substrate comprises selecting the supporting substrate to comprise the WC particles dispersed within a homogenized Co—Al—W—C alloy binder.

3. The method of claim 1, wherein subjecting the supporting substrate and the powder to elevated temperatures and elevated pressures to diffuse a portion of the homogenized binder of the supporting substrate into the powder comprises heating the supporting substrate and the powder to at least one temperature greater than the solidus temperature of the homogenized binder and to at least one pressure greater than 1 atmosphere.

4. The method of claim 1, wherein converting the homogenized binder within interstitial spaces between the inter-bonded diamond particles into a thermally stable material comprises forming the thermally stable material to comprise one or more $Co_3AlC_{1-x}$ precipitates, where $0 \leq x \leq 0.5$.

5. The method of claim 1, wherein converting the homogenized binder within interstitial spaces between the inter-bonded diamond particles into a thermally stable material comprises forming the thermally stable material to further comprise one or more of FCC $L1_2$ phase precipitates, FCC $DO_{22}$ phase precipitates, $D8_5$ phase precipitates, $DO_{19}$ phase precipitates, $\beta$ phase precipitates, FCC $L1_0$ phase precipitates, WC precipitates, and $M_xC$ precipitates, where x>2 and M=Co,W.

6. The method of claim 1, further comprising solution treating the thermally stable material to decompose the κ-carbide precipitates thereof into FCC $L1_2$ phase precipitates.

7. A method of forming a cutting element, comprising:
forming a precursor composition comprising discrete WC particles, a binding agent, and discrete particles comprising Co, Al, and one or more of C and W;
subjecting the precursor composition to a consolidation process employing a consolidation temperature greater than or equal to a liquidus temperature of the discrete particles comprising Co, Al, and one or more of C and W to form a supporting substrate including WC particles dispersed in a homogenized binder comprising from about 66 wt % Co to about 90 wt % Co, from about 5.0 wt % Al to about 15 wt % Al, from about 0.1 wt % C to about 0.2 wt % C, and from about 5.0 wt % W to about 30 wt % W;
depositing a powder comprising diamond particles over the supporting substrate;
subjecting the supporting substrate and the powder to elevated temperatures and elevated pressures to diffuse a portion of the homogenized binder of the supporting substrate into the powder and inter-bond the diamond particles; and
converting the homogenized binder within interstitial spaces between the inter-bonded diamond particles into a thermally stable material substantially free of catalytic Co, without leaching, and comprising κ-carbide precipitates.

8. The method of claim 7, wherein subjecting the precursor composition to at least one consolidation process comprises:
sintering the precursor composition at the consolidation temperature to form a preliminary supporting substrate comprising the WC particles dispersed in a partially homogenized binder comprising Co, W, C, and Al; and
heating the preliminary supporting substrate to a temperature greater than a liquidus temperature of the partially homogenized binder to form the supporting substrate.

9. The method of claim 8, wherein sintering the precursor composition further comprises subjecting the precursor composition to an applied pressure greater than or equal to about 10 megapascals.

10. The method of claim 9, wherein subjecting the supporting substrate and the powder to elevated temperatures and elevated pressures comprises heating the supporting substrate and the powder to a temperature greater than or equal to the liquidus temperature of the homogenized binder of the supporting substrate.

* * * * *